US012704613B2

(12) United States Patent
Brock et al.

(10) Patent No.: US 12,704,613 B2
(45) Date of Patent: Aug. 11, 2026

(54) PROCESSING CIRCUITRY, SYSTEM AND METHOD TO TEST PIXELS IN AN ULTRASONIC IMAGING DEVICE BASED ON COMPARING A BASELINE PIXEL PERFORMANCE DATASET WITH A CURRENT PIXEL PERFORMANCE DATASET

(71) Applicant: Exo Imaging, Inc., Santa Clara, CA (US)

(72) Inventors: Anthony E. Brock, Half Moon Bay, CA (US); Brian Bircumshaw, Orinda, CA (US); Jonathan R. Strode, Los Altos, CA (US)

(73) Assignee: Exo Imaging, Inc., Santa Clara, CA (US)

(*) Notice: Subject to any disclaimer, the term of this patent is extended or adjusted under 35 U.S.C. 154(b) by 222 days.

(21) Appl. No.: 18/549,051

(22) PCT Filed: Mar. 31, 2021

(86) PCT No.: PCT/US2021/025267

§ 371 (c)(1),
(2) Date: Sep. 5, 2023

(87) PCT Pub. No.: WO2022/211809

PCT Pub. Date: Oct. 6, 2022

(65) Prior Publication Data

US 2024/0151838 A1 May 9, 2024

(51) Int. Cl.
*G01S 7/52* (2006.01)
*G01S 15/89* (2006.01)

(52) U.S. Cl.
CPC ........ *G01S 7/5208* (2013.01); *G01S 7/52046* (2013.01); *G01S 15/8918* (2013.01); *G01S 15/8993* (2013.01)

(58) Field of Classification Search
CPC ......... A61B 8/13; A61B 8/488; A61B 8/4444; A61B 8/58; B06B 1/0292; B06B 1/0622;
(Continued)

(56) References Cited

U.S. PATENT DOCUMENTS 4,603,702 A 8/1986 Hwang et al.
5,517,994 A * 5/1996 Burke .................. G01S 7/5205 600/443
(Continued)

FOREIGN PATENT DOCUMENTS

JP H08238243 A 9/1996
JP 2019201928 A 11/2019
(Continued)

OTHER PUBLICATIONS

EPO European Extended Search Report in EP Application Serial No. 21935394.3 mailed on Nov. 13, 2024, 15 pages.
(Continued)

*Primary Examiner* — Chad Dickerson
(74) *Attorney, Agent, or Firm* — Alliance IP, LLC

(57) ABSTRACT

An apparatus, a method, and computer-implemented media. The apparatus is to determine a current pixel performance dataset for one or more pixels within a transducer array of pixels located adjoining a first medium with a first acoustic impedance Z1, the transducer array within an imaging device, the current pixel performance dataset obtained from a current pixel performance receive cycle of the one or more pixels against a second medium with a second acoustic impedance Z2 larger than Z1; perform a comparison of the current pixel performance dataset with a baseline pixel performance dataset for the one or more pixels, the baseline pixel performance dataset obtained from a baseline pixel performance receive cycle of the one or more pixels against the second medium, wherein implementation of the current
(Continued)

pixel performance receive cycle and of the baseline pixel performance receive cycle is performed without alignment of the second medium with respect to the imaging device; and determine a defective pixel dataset for one or more defective pixels of the one or more pixels based on the comparison.

24 Claims, 20 Drawing Sheets

(58) Field of Classification Search
CPC ............. B06B 2201/76; G01S 15/8918; G01S 15/8925; G01S 15/8993; G01S 7/52046; G01S 7/5205; G01S 7/5208
USPC .................................................. 382/219–221
See application file for complete search history.

(56) References Cited

U.S. PATENT DOCUMENTS

2018/0153517 A1* 6/2018 Chang .................... H04R 29/00
2019/0018123 A1* 1/2019 Narasimha-Iyer .... G01S 7/5205
2020/0000435 A1* 1/2020 Anand ..................... A61B 8/46
2020/0397412 A1 12/2020 Noguchi
2022/0015744 A1* 1/2022 Valentin ............... A61B 8/4444

FOREIGN PATENT DOCUMENTS

JP 2020534539 A 11/2020
JP 2021500134 A 1/2021

OTHER PUBLICATIONS

Japanese Office Action received in Application No. 2023-554925, dated Sep. 17, 2024, with English translation, 9 pages.
Japanese Office Action received in Application No. 2023-554925, dated Feb. 10, 2025, with English translation, 10 pages.
PCT International Search Report and Written Opinion issued in PCT/US2021/025267, dated Dec. 29, 2021; 14 pages.
KIPO Office Action received in Application No. 10-2023-7036937, dated Feb. 25, 2026, with English translation, 26 pages.
CNIPA Office Action received in Application No. 202180096744.6, dated May 27, 2026, with Machine English translation, 20 pages.
EPO Communication Pursuant to Article 94(3) EPC in EP Application Serial No. 21 935 394.3 mailed on May 28, 2026, 14 pages.

* cited by examiner

PROCESSING CIRCUITRY, SYSTEM AND METHOD TO TEST PIXELS IN AN ULTRASONIC IMAGING DEVICE BASED ON COMPARING A BASELINE PIXEL PERFORMANCE DATASET WITH A CURRENT PIXEL PERFORMANCE DATASET

CROSS-REFERENCE TO RELATED APPLICATION

This Application is a national phase filing under 35 U.S.C. § 371 of International Patent Application Serial No. PCT/US2021/025267, filed Mar. 31, 2021, and entitled, "PROCESSING CIRCUITRY, SYSTEM AND METHOD TO TEST PIXELS IN AN ULTRASONIC IMAGING DEVICE," the entire disclosure of which is incorporated herein by reference.

FIELD

Embodiments relate in general to the field of signal processing for imaging devices, and in particular to the field of signal processing for ultrasound imaging devices or probes such as ones including micromachined ultrasound transducers (MUTs),

BACKGROUND

Ultrasound imaging is widely used in the fields of medicine and non-destructive testing.

An ultrasound imaging probe or ultrasonic imaging device typically includes an array of many individual ultrasonic transducers (pixels) which are used to emit and receive acoustic energy. The performance of an ultrasonic imaging device depends on the performance and contribution of each pixel in the array of pixels that make up each transducer element. Conventionally, to characterize pixel performance, test methods have utilized reflectors such as a flat plate, a wire, or pin targets in the path of the transmitted acoustic energy to reflect the transmitted energy back to the transmitting pixel. The energy is detected at the pixel upon reflection of the transmitted energy off of the solid reflectors, and an pixel's combined transmit and receive performance is determined.

An acoustic reflection occurs when an acoustic wave traveling through a first medium of an acoustic impedance, $Z_1$, reaches a boundary with a second medium having an acoustic impedance $Z_2$ different from $Z_1$. The amplitude of reflection is defined by the relationship of $Z_1$ and $Z_2$ as:

$$R = \frac{Z_2 - Z_1}{Z_2 + Z_1} \quad \text{Eq. (10)}$$

where R is the reflection coefficient that will determine the amplitude of the reflected acoustic pressure wave from the impedance mismatched boundary between the first medium and the second medium.

Conventional acoustic energy reflectors have a $Z_2$ impedance that is much greater than the $Z_1$ impedance in order to maximize reflection by achieving a larger reflection coefficient R. An example is an ultrasonic imaging device setup transmitting in water, which has acoustic impedance, $Z_1$, of approximately 1.5 MRayls and a stainless-steel reflector plate which has an acoustic impedance, $Z_2$, of approximately 45 MRayls giving a reflection coefficient of 0.935, or 93.5% reflection amplitude of transmitted amplitude. A strong reflection coefficient is desirable so that a transmitted signal which reduces in amplitude as it travels through a medium due to losses has a maximized reflection which can be received back at the transducer surface. If the signal is not maximized, the losses in amplitude as the signal travels through a medium may be too large such that the signal cannot be detected. Any acoustic mismatch between mediums will result in reflection at the boundary of the mediums.

However, disadvantageously, setup of a reflector plate requires test fixtures and an alignment of the plate with the transducer array. A medium to transfer the acoustic energy to the reflector is also required which is typically water or tissue mimicking material. The distance from the transducer to the reflector plate, and the distance back from the reflector plate to the transducer make up the total path length for the acoustic energy. A greater path length results in a signal with greater losses in amplitude and a greater increase in time for travel of the signal.

BRIEF DESCRIPTION OF THE DRAWINGS

Some of the features of the embodiments are set forth with particularity in the appended claims. A better understanding of the features and advantages of embodiments will be obtained by reference to the following detailed description, in which the principles of the embodiments are utilized, and the accompanying drawings (also "Figure" and "Fig." herein), of which:

DETAILED DESCRIPTION

Figure 1:
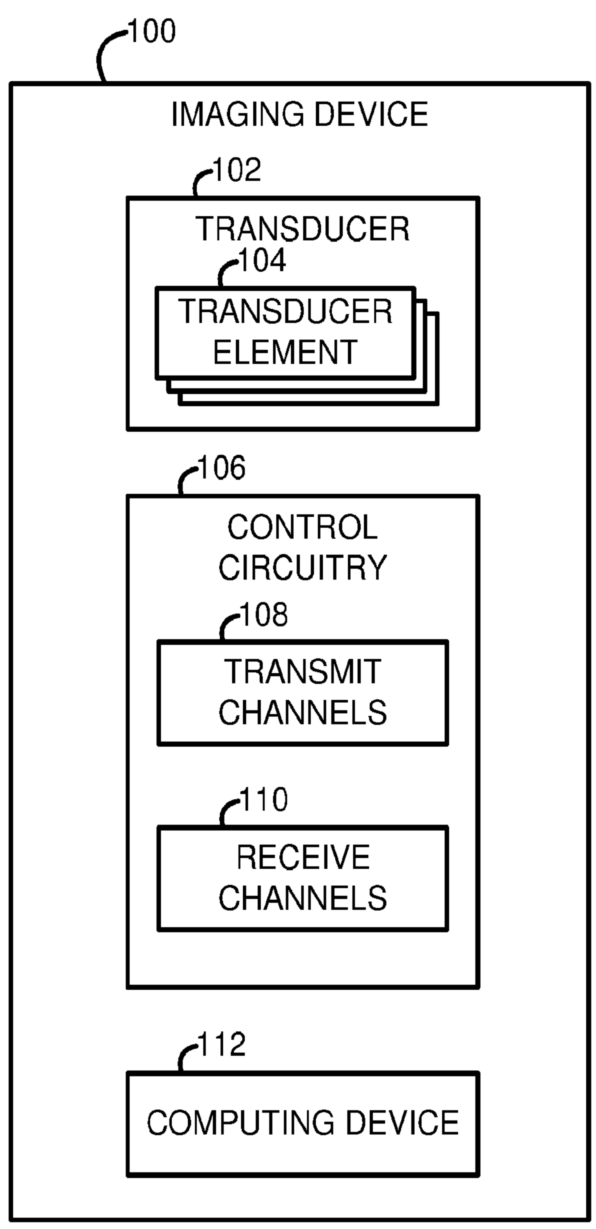
FIG. 1 is a block diagram of an imaging device with selectively alterable characteristics, in accordance with disclosed embodiments.

Some embodiments provide an apparatus, a method, and computer-implemented media. The apparatus is to determine a current pixel performance dataset for one or more pixels within a transducer array of pixels located adjoining a first medium with a first acoustic impedance Z1, the transducer array within an imaging device, the current pixel performance dataset obtained from a current pixel performance receive cycle of the one or more pixels against a second medium with a second acoustic impedance Z2 larger than Z1; perform a comparison of the current pixel performance dataset with a baseline pixel performance dataset for the one or more pixels, the baseline pixel performance dataset obtained from a baseline pixel performance receive cycle of the one or more pixels against the second medium, wherein implementation of the current pixel performance receive cycle and of the baseline pixel performance receive cycle is performed without alignment of the second medium with respect to the imaging device; and determine a defective pixel dataset for one or more defective pixels of the one or more pixels based on the comparison.

Advantageously, embodiments allow the determination of defective pixel dataset (data relating to one or more defective pixels) without alignment of a matching layer against the imaging device. In addition, advantageously, some embodiments allow the communication of defective pixel dataset, and of recommended next steps regarding the defective pixel dataset to a user. Moreover, according to some other embodiments, an imaging device may communicate its defective pixel dataset to a remote device to allow an aggregation of defective pixel dataset at the remote device regarding a plurality of imaging devices, and a determination of next steps regarding design improvements, use conditions, or other factors regarding performance of the plurality of imaging devices.

In general, the embodiments relate to imaging devices, and more particularly to imaging devices having electronically configurable ultrasonic transducer elements and associated image reconstruction circuitry. Non-intrusive imaging devices can be used to image internal tissue, bones, blood flow, or organs of human or animal bodies.

Some embodiments of an imaging device may include hardware and/or software to control a selective activation and deactivation of transducer elements of the imaging device to achieve a transmit and receive pattern of ultrasonic waveforms to enable the generation of an image from an object while achieving power savings.

An "ultrasonic waveform" as mentioned herein, for example in a medium such as water, flesh, lens, etc., may, in some embodiments, refers to a compensation of the waveforms of each of the transmitting transducer elements. Although the transducer elements, such as groups of transducer elements, according to some embodiments, may sometimes fire together, they may often be fired separately from one another (e.g. to steer).

It is to be noted that "pixel" as used herein refers to a single MUT (that is, a device with a single diaphragm or membrane), whereas a transducer "element" may refer to an pixel or to a group of pixels ganged together and behaving as one.

Some embodiments of an imaging device may additionally include hardware and/or software to receive reflected ultrasonic energy from an object to be imaged, and to convert the received ultrasonic energy into electrical signals.

Some embodiments of an imaging device may further include hardware and/or software to construct an image of the object to be imaged, to cause a display of the image, and/or to display the image.

To perform the imaging, an imaging device may transmit an ultrasonic waveform into body tissue toward an object to be imaged, and receive reflected ultrasonic energy from the object. Such an imaging device may include one or more transducer elements, and which may function using photo-acoustic or ultrasonic effects. Such transducer elements may be used for imaging, and may further be used in other applications. For example, the transducer elements may be used in medical imaging, for flow measurements in pipes, in speaker and microphone arrays, in lithotripsy, for localized tissue heating for therapeutic purposes, and in highly intensive focused ultrasound (HIFU) surgery.

In the context of embodiments, although ultrasonic waveforms, ultrasonic waves, ultrasonic pressure waves, and/or the use of ultrasound is called out expressly, embodiments are not limited to ultrasound specifically, and include within their scope the generation and processing of waves that can propagate in a body, be reflected back from an object of the body, and be decoded/analyzed/processed to allow generation of information pertaining to the object, such as the generation of an image corresponding to the object on a display device.

Traditionally, imaging devices such as ultrasound imagers used in medical imaging use piezoelectric (PZT) materials or other piezo ceramic and polymer composites. Such imaging devices may include a housing to house the transducers with the PZT material, as well as other electronics that form and display the image on a display unit. To fabricate the bulk PZT elements or the transducers, a thick piezoelectric material slab can be cut into large rectangular shaped PZT elements. These rectangular-shaped PZT elements can be expensive to build, since the manufacturing process involves precisely cutting generally the rectangular-shaped thick PZT or ceramic material and mounting it on substrates with precise spacing. Further, the impedance of the transducers is much higher than the impedance of the transmit/receive electronics for the transducers, which can affect performance.

Embodiments of the present disclosure may be utilized in the context of imaging devices that utilize either piezoelectric micromachined ultrasound transducer (pMUT) or capacitive micromachine ultrasonic transducer (cMUT) technologies, as described in further detail herein.

In general, MUTs, such as both cMUT and pMUT, include a diaphragm (a thin membrane attached at its edges, or at some point in the interior of the probe), whereas a "traditional," bulk PZT element typically consists of a solid piece of material.

Piezoelectric micromachined ultrasound transducers (pMUTs) can be efficiently formed on a substrate leveraging various semiconductor wafer manufacturing operations. Semiconductor wafers may currently come in 6 inch, 8 inch, and 12 inch sizes and are capable of housing hundreds of transducer arrays. These semiconductor wafers start as a silicon substrate on which various processing operations are performed. An example of such an operation is the formation of $SiO_2$ layers, also known as insulating oxides. Various other operations such as the addition of metal layers to serve as interconnects and bond pads are performed to allow connection to other electronics. Yet another example of a machine operation is the etching of cavities. Compared to the conventional transducers having bulky piezoelectric material, pMUT elements built on semiconductor substrates are less bulky, are cheaper to manufacture, and have simpler and higher performance interconnection between electronics and transducers. As such, they provide greater flexibility in the operational frequency of the imaging device using the same, and potential to generate higher quality images.

In some embodiments, the imaging device may include an application specific integrated circuit (ASIC) that includes one or more transmit drivers, sensing circuitry to process electrical energy corresponding to received ultrasound energy reflected back from the object to be imaged (echo signals), and other processing circuitry to control various other operations. The ASIC can be formed on another semiconductor wafer, or on the same semiconductor wafer. This ASIC can be placed in close proximity to pMUT elements to reduce parasitic losses. As a specific example, the ASIC may be 50 micrometers (μm) or less away from a transducer array including the pMUT elements. In a broader example, there may be less than 100 μm separation between the 2 wafers or 2 die, where each wafer includes many die and a die includes a transducer in the transducer wafer and an ASIC in the ASIC wafer. In some embodiments, the ASIC has a matching footprint relative to the pMUT transducer that includes the pMUT elements, and thus may be stacked for wafer-to-wafer interconnection with the pMUT transducer die, for example with an ASIC wafer being stacked with the transducer die or an ASIC die itself being stacked with the transducer die through interconnects. Alternatively, the transducer can also be developed on top of the ASIC wafer as a single device using low temperature piezo material sputtering and other low temperature processing compatible with ASIC processing.

Wherever the ASIC and the transducer interconnect, according to one embodiment, the two may have similar footprints. More specifically, according to the latter embodiment, a footprint of the ASIC may be an integer multiple or divisor of the pMUT footprint.

Regardless of whether the imaging device uses pMUT elements or cMUT elements in its transducer(s), an imaging device according to some embodiments may include a number of transmit channels and a number of receive channels. Transmit channels are to drive the transducer elements with a voltage pulse at a frequency the elements are responsive to. This causes an ultrasonic waveform to be emitted from the elements, which waveform is to be directed towards an object to be imaged, such as toward an organ in a body. In some examples, the imaging device with the array of transducer elements may make mechanical contact with the body using a gel in between the imaging device and the body. The ultrasonic waveform travels towards the object, i.e., an organ, and a portion of the waveform is reflected back to the transducer elements in the form of received/reflected ultrasonic energy where the received ultrasonic energy may converted to an electrical energy within the imaging device. The received ultrasonic energy may then be further processed by a number of receive channels to convert the received ultrasonic energy to electrical signals, and the electrical signals may be processed by other circuitry to develop an image of the object for display based on the electrical signals.

An embodiment of an ultrasound imaging device includes a transducer array, and control circuitry including, for example, an application-specific integrated circuit (ASIC), and transmit and receive beamforming circuitry, and optionally additional control electronics.

An imaging device incorporating features of the embodiments may advantageously reduce or resolve these and other technical issues. Specifically, the imaging device may be configured to control transmit (Tx) firings (the transmissions of ultrasonic waveforms from a transducer element) in a manner that controls power dissipation without exceeding temperature limits of the imaging device all while maintaining needed image quality. The number of receive channels and/or transmit channels used to form an image are electronically selectively adaptable (may be selectively activated, powered down, or placed in low power) for example in order to save power, for example in cases where a lower number of channels is acceptable, that is, where a lower number of channels can still result in a display image that can be useful. As a specific example, each of the number of transmit and/or receive channels may be dynamically controlled, for example by control circuitry of the image device, to reduce power, or may be powered down entirely. Additionally, other characteristics of each channel may also be configurable.

In an embodiment, an imaging device may include a handheld casing where transducers and associated electronic circuitries, such as a control circuitry and optionally a computing device are housed. The imaging device may also contain a battery to power the electronic circuitries.

Thus, some embodiments pertain to a portable imaging device utilizing either pMUT elements or cMUT elements in a 2D array. In some embodiments, such an array of transducer elements is coupled to an application specific integrated circuit (ASIC) of the imaging device.

In the following description, for purposes of explanation, specific details are set forth in order to provide an understanding of the disclosure. It will be apparent, however, to one skilled in the art that the disclosure can be practiced without these details. Furthermore, one skilled in the art will recognize that examples of the present disclosure, described below, may be implemented in a variety of ways, such as a process, one or more processors (processing circuitry) of a control circuitry, one or more processors (or processing circuitry) of a computing device, a system, a device, or a method on a tangible computer-readable medium.

One skilled in the art shall recognize: (1) that certain fabrication operations may optionally be performed; (2) that operations may not be limited to the specific order set forth herein; and (3) that certain operations may be performed in different orders, including being done contemporaneously.

Elements/components shown in diagrams are illustrative of exemplary embodiments and are meant to avoid obscuring the disclosure. Reference in the specification to “one example,” “preferred example,” “an example,” “examples,” “an embodiment,” “some embodiments,” or “embodiments” means that a particular feature, structure, characteristic, or function described in connection with the example is included in at least one example of the disclosure and may be in more than one example. The appearances of the phrases "in one example," "in an example," "in examples," "in an embodiment," "in some embodiments," or "in embodiments" in various places in the specification are not necessarily all referring to the same example or examples. The terms "include," "including," "comprise," and "comprising" shall be understood to be open terms and any lists that follow are examples and not meant to be limited to the listed items. Any headings used herein are for organizational purposes only and shall not be used to limit the scope of the description or the claims. Furthermore, the use of certain terms in various places in the specification is for illustration and should not be construed as limiting.

Turning now to the figures, FIG. 1 is a block diagram of an imaging device 100 with a controller or control circuitry 106 controlling selectively alterable channels (108, 110) and having imaging computations performed on a computing device 112 according to principles described herein. As described above, the imaging device 100 may be used to generate an image of internal tissue, bones, blood flow, or organs of human or animal bodies. Accordingly, the imaging device 100 may transmit a signal into the body and receive a reflected signal from the body part being imaged. Such imaging devices may include either pMUT or cMUT, which may be referred to as transducers or imagers, which may be based on photo-acoustic or ultrasonic effects. The imaging device 100 can be used to image other objects as well. For example, the imaging device can be used in medical imaging; flow measurements in pipes, speaker, and microphone arrays; lithotripsy; localized tissue heating for therapeutic; and highly intensive focused ultrasound (HIFU) surgery.

In addition to use with human patients, the imaging device 100 may be used to acquire an image of internal organs of an animal as well. Moreover, in addition to imaging internal organs, the imaging device 100 may also be used to determine direction and velocity of blood flow in arteries and veins as in Doppler mode imaging and may also be used to measure tissue stiffness.

The imaging device 100 may be used to perform different types of imaging. For example, the imaging device 100 may be used to perform one-dimensional imaging, also known as A-Scan, two-dimensional imaging, also known as B scan, three-dimensional imaging, also known as C scan, and Doppler imaging. The imaging device 100 may be switched to different imaging modes, including without limitation linear mode and sector mode, and electronically configured under program control.

To facilitate such imaging, the imaging device 100 includes one or more ultrasound transducers 102, each transducer 102 including an array of ultrasound transducer elements 104. Each ultrasound transducer element 104 may be embodied as any suitable transducer element, such as a pMUT or cMUT element. The transducer elements 104 operate to 1) generate the ultrasonic pressure waves that are to pass through the body or other mass and 2) receive reflected waves (received ultrasonic energy) off the object within the body, or other mass, to be imaged. In some examples, the imaging device 100 may be configured to simultaneously transmit and receive ultrasonic waveforms or ultrasonic pressure waves (pressure waves in short). For example, control circuitry 106 may be configured to control certain transducer elements 104 to send pressure waves toward the target object being imaged while other transducer elements 104, at the same time, receive the pressure waves/ultrasonic energy reflected from the target object, and generate electrical charges based on the same in response to the received waves/received ultrasonic energy/received energy.

In some examples, each transducer element 104 may be configured to transmit or receive signals at a certain frequency and bandwidth associated with a center frequency, as well as, optionally, at additional center frequencies and bandwidths. Such multi-frequency transducer elements 104 may be referred to as multi-modal elements 104 and can expand the bandwidth of the imaging device 100. The transducer element 104 may be able to emit or receive signals at any suitable center frequency, such as about 0.1 to about 100 megahertz. The transducer element 104 may be configured to emit or receive signals at one or more center frequencies in the range from about 3.5 to about 5 megahertz.

To generate the pressure waves, the imaging device 100 may include a number of transmit (Tx) channels 108 and a number of receive (Rx) channels 110. The transmit channels 108 may include a number of components that drive the transducer 102, i.e., the array of transducer elements 104, with a voltage pulse at a frequency that they are responsive to. This causes an ultrasonic waveform to be emitted from the transducer elements 104 towards an object to be imaged.

According to some embodiments, an ultrasonic waveform may include one or more ultrasonic pressure waves transmitted from one or more corresponding transducer elements of the imaging device substantially simultaneously.

The ultrasonic waveform travels towards the object to be imaged and a portion of the waveform is reflected back to the transducer 102, which converts it to an electrical energy through a piezoelectric effect. The receive channels 110 collect electrical energy thus obtained, and process it, and send it for example to the computing device 112, which develops or generates an image that can be displayed.

In some examples, while the number of transmit channels 108 and receive channels 110 in the imaging device 100 may remain constant, and the number of transducer elements 104 that they are coupled to may vary. A coupling of the transmit and receive channels to the transducer elements may be, in one embodiment, controlled by control circuitry 106. In some examples, for example as shown in FIG. 1, the control circuitry may include the transmit channels 108 and in the receive channels 110. For example, the transducer elements 104 of a transducer 102 may be formed into a two-dimensional spatial array with N columns and M rows. In a specific example, the two-dimensional array of transducer elements 104 may have 128 columns and 32 rows. In this example, the imaging device 100 may have up to 128 transmit channels 108 and up to 128 receive channels 110. In this example, each transmit channel 108 and receive channel 110 may be coupled to multiple or single pixels 104. For example, depending on the imaging mode (for example, whether a linear mode where a number of transducers transmit ultrasound waves in a same spatial direction, or a sector mode, where a number of transducers transmit ultrasound waves in different spatial directions), each column of transducer elements 104 may be coupled to a single transmit channel 108 and a single receive channel (110). In this example, the transmit channel 108 and receive channel 110 may receive composite signals, which composite signals combine signals received at each transducer element 104 within the respective column. In another example, i.e., during a different imaging mode, each transducer element 104 may be coupled to its dedicated transmit channel 108 and its dedicated receive channel 110. In some embodiments, a transducer element 104 may be coupled to both a transmit channel 108 and a receive channel 110. For example, a transducer element 104 may be adapted to create and transmit an ultrasound pulse and then detect the echo of that pulse in the form of converting the reflected ultrasonic energy into electrical energy.

The control circuitry 106 may be embodied as any circuit or circuits configured to perform the functions described herein. For example, the control circuitry 106 may be embodied as or otherwise include an application specific integrated circuit (ASIC), a field programmable gate array (FPGA), a system-on-a-chip, a processor and memory, a voltage source, a current source, one or more amplifiers, one or more digital-to-analog converters, one or more analog-to-digital converters, etc.

The illustrative computing device 112 may be embodied as any suitable computing device including any suitable components, such as a processor, memory, communication circuitry, battery, display, etc. In one embodiment, the computing device 112 may be integrated with the control circuitry 106, transducers 102, etc., into a single package or single chip, or a single system on a chip (SoC), as suggested for example in the embodiment of FIG. 1. In other embodiments, some or all of the computing devices may be in a separate package from the control circuitry, and the transducers, etc., as suggested for example in the embodiment of in FIG. 2 as will be described in further detail below.

Each transducer element may have any suitable shape such as, square, rectangle, ellipse, or circle. The transducer elements may be arranged in a two dimensional array arranged in orthogonal directions, such as in N columns and M rows as noted herein, or may be arranged in an asymmetric (or staggered) rectilinear array.

Transducer elements 104 may have associated transmit driver circuits of associated transmit channels, and low noise amplifiers of associated receive channels. Thus, a transmit channel may include transmit drivers, and a receive channel may include one or more low noise amplifiers. For example, although not explicitly shown, the transmit and receive channels may each include multiplexing and address control circuitry to enable specific transducer elements and sets of transducer elements to be activated, deactivated or put in low power mode. It is understood that transducers may be arranged in patterns other than orthogonal rows and columns, such as in a circular fashion, or in other patterns based on the ranges of ultrasonic waveforms to be generated therefrom.

Figure 2:
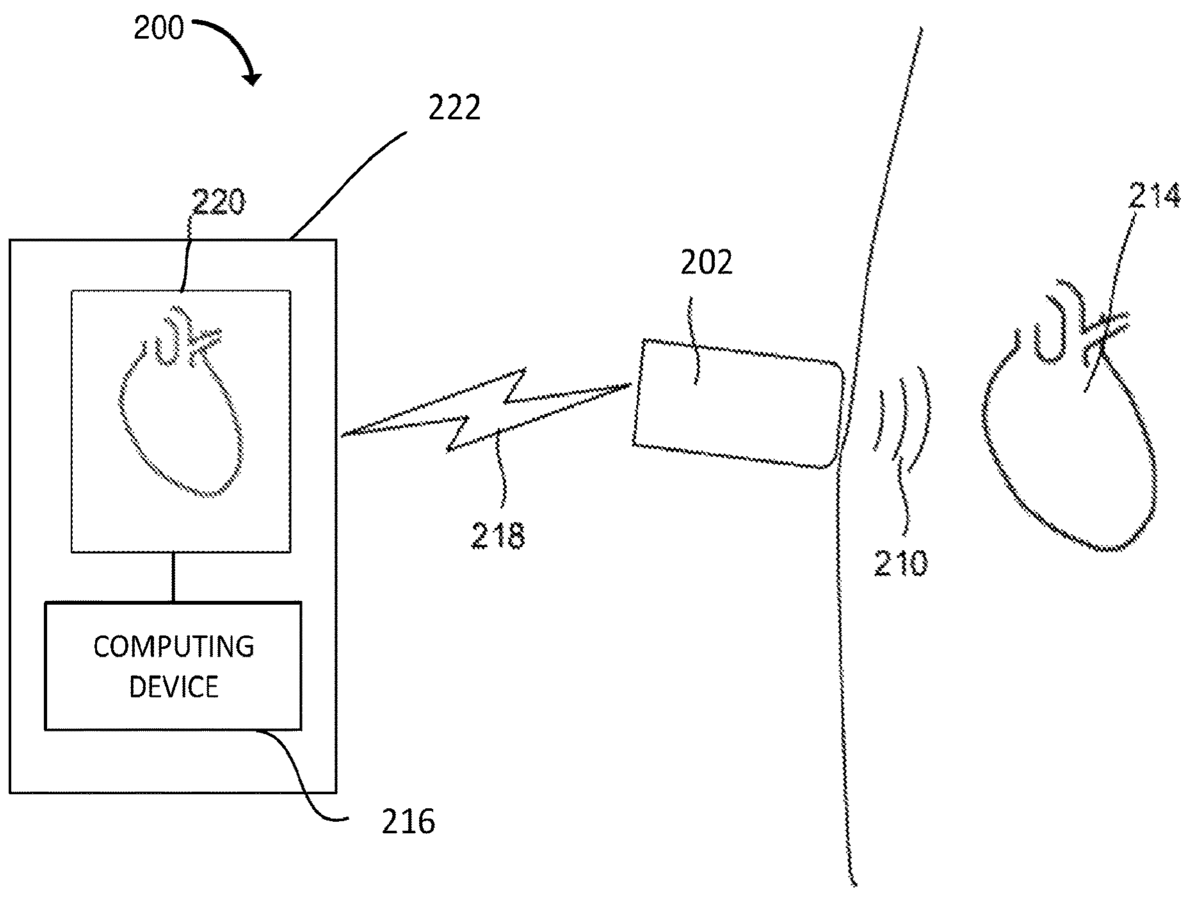
FIG. 2 is a diagram of an imaging system with selectively alterable characteristics, in accordance with disclosed embodiments.

FIG. 2 is a diagram of an imaging environment including an imaging system with selectively configurable characteristics, according to an embodiment. The imaging system of FIG. 2 may include an imaging device 202 and a computing system 222 which includes a computing device 216 and a display 220 coupled to the computing device, as will be described in further detail below.

As depicted in FIG. 2, the computing device 216 may, according to one embodiment, and unlike the embodiment of FIG. 1, be physically separate from the imaging device 220. For example, the computing device 216 and display device 220 may be disposed within a separate device (in this context, the shown computing system 222, physically separate from imaging device 202 during operation) as compared with the components of the imaging device 202. The computing system 222 may include a mobile device, such as cell phone or tablet, or a stationary computing device, which can display images to a user. In another example, as shown in FIG. 1 for example, the display device, the computing device, and associated display, may be part of the imaging device 202 (now shown). That is, the imaging device 100, computing device 216, and display device 220 may be disposed within a single housing.

A "computing device" as referred to herein may, in some embodiments, be configured to generate signals to at least one of cause an image of the object to be displayed on a display, or cause information regarding a defective pixel to be communicated to a user. Causing the information regarding defective pixels may include causing graph of a time domain receive waveform of an pixel or group of pixels to be displayed on a display, cause a heat map of defective pixels to be displayed on a display, cause a voice message relating to defective pixels to be played at a speaker, cause text relating to defective pixels to be displayed on a display. The generation of the signals may include, in some embodiments, implementing an interlacing algorithm as will be described further below.

As depicted, the imaging system includes the imaging device 202 that is configured to generate and transmit, via the transmit channels (FIG. 1, 108), pressure waves 210 toward an object, such as a heart 214, in a transmit mode/process. The internal organ, or other object to be imaged, may reflect a portion of the pressure waves 210 toward the imaging device 202 which may receive, via a transducer (such as transducer 102 of FIG. 1), receive channels (FIG. 1, 110), control circuitry (FIG. 1, 106), the reflected pressure waves. The transducer may generate an electrical signal based on the received ultrasonic energy in a receive mode/process. A transmit mode or receive mode may be applicable in the context of imaging devices that may be configured to either transmit or receive, but at different times. However, as noted previously, some imaging devices according to embodiments may be adapted to be in both a transmit mode and a receive mode simultaneously. The system also includes a computing device 216 that is to communicate with the imaging device 100 through a communication channel, such as a wireless communication channel 218 as shown, although embodiments also encompass within their scope wired communication between a computing system and imaging device. The imaging device 100 may communicate signals to the computing device 216 which may have one or more processors to process the received signals to complete formation of an image of the object. A display device 220 of the computing system 222 may then display images of the object using the signals from the computing device. The computing system may further convey information to a user regarding a defective pixel as noted above.

An imaging device according to some embodiments may include a portable device, and/or a handheld device that is adapted to communicate signals through a communication channel, either wirelessly (using a wireless communication protocol, such as an IEEE 802.11 or Wi-Fi protocol, a Bluetooth protocol, including Bluetooth Low Energy, a mmWave communication protocol, or any other wireless communication protocol as would be within the knowledge of a skilled person) or via a wired connection such as a cable (such as USB2, USB 3, USB 3.1, and USB-C) or such as interconnects on a microelectronic device, with the computing device. In the case of a tethered or wired, connection, the imaging device may include a port as will be described in further detail in the context of FIG. 3A for receiving a cable connection of a cable that is to communicate with the computing device. In the case of a wireless connection, the imaging device 100 may include a wireless transceiver to communicate with the computing device 216.

It should be appreciated that, in various embodiments, different aspects of the disclosure may be performed in different components. For example, in one embodiment, the imaging device may include circuitry (such as the channels) to cause ultrasound waveforms to be sent and received through its transducers, while the computing device may be adapted to control such circuitry to the generate ultrasound waveforms at the transducer elements of the imaging device using voltage signals, and further a processing of the received ultrasonic energy to determine a defective pixel dataset for one or more defective pixels. In such an embodiment, the computing device may manage/control a functioning of the imaging device based on the determination of the defective pixels, may construct images of the object using frames as discussed in more detail below, may select and configure transmit and receive channels, etc.

In another embodiment, the imaging device may include control circuitry to control a generation of the ultrasound waveforms at the transducer elements using voltage signals in order to cause the ultrasound waveform to be sent and received from the transducer elements, and may also generate electrical signals from the received ultrasound energy, and, in a test mode, use electrical signals corresponding to the received ultrasound waveforms to determine information regarding one or more defective pixels of the imaging device. In such an embodiment, the control circuitry of the imaging device may send the electrical signals generated from the received ultrasound energy to the computing device, which may process them in order to determine the information regarding one or more defective pixels. More generally, it should be appreciated that any suitable function disclosed herein may be performed by one or more circuitries, and that these circuitries may be housed in one physical device, or housed physically separately from each other, but communicatively coupled to one another.

Figure 3A:
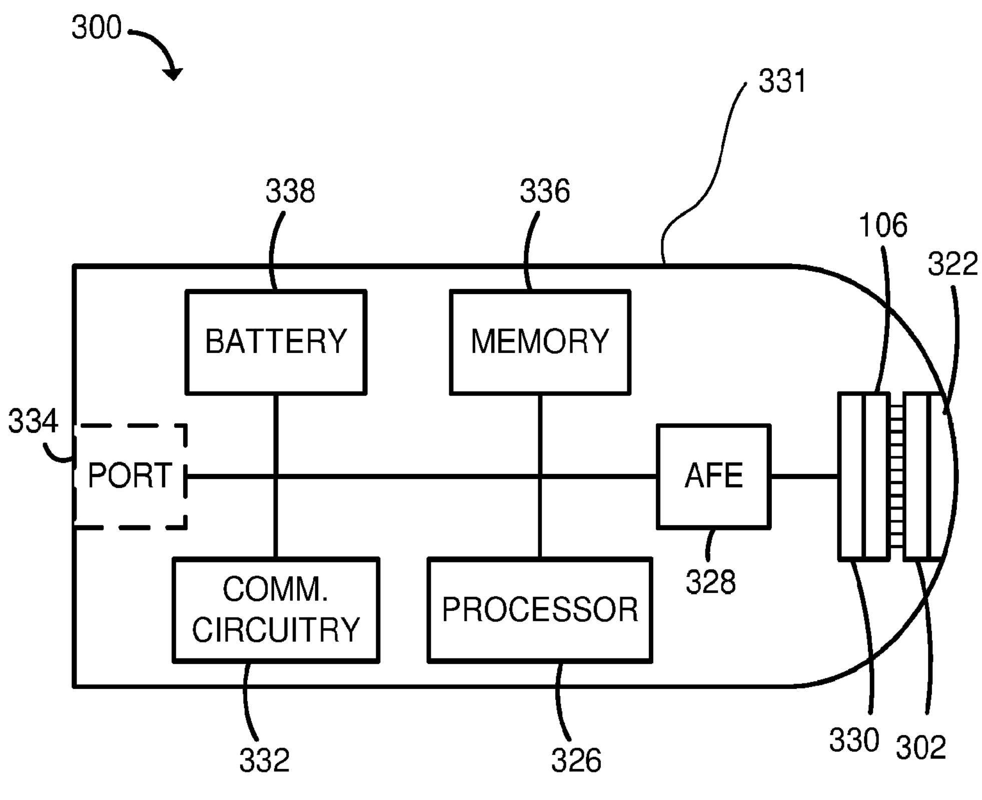
FIG. 3A is a schematic diagram of an imaging device with selectively alterable characteristics, in accordance with some disclosed embodiments.
Figure 3B:
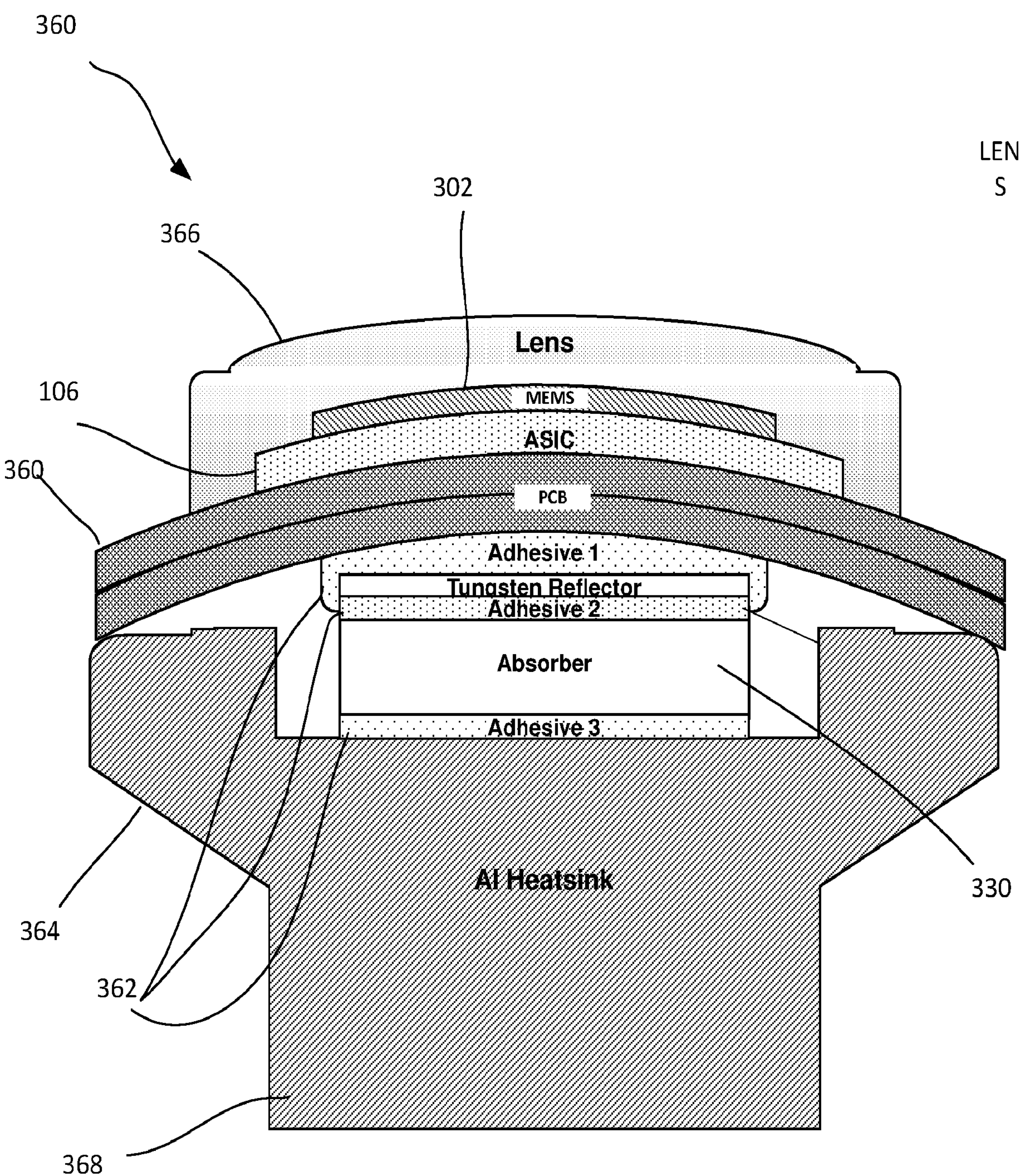
FIG. 3B is a schematic diagram of internal components of the imaging device of FIG. 3A according to one embodiment.

FIGS. 3A and 3B represent, respectively, views of an imaging device and of internal components within the housing of imaging device according to some embodiments, as will be described in further detail below.

As seen in FIG. 3A, the imaging device 300 may include a handheld casing 331 where transducers 302 and associated electronics are housed. The imaging device may also contain a battery 338 to power the electronics. FIG. 3A thus shows an embodiment of a portable imaging device capable of 2D and 3D imaging using pMUTs in a 2D array, optionally built on a silicon wafer. Such an array coupled to an application specific integrated circuit (ASIC) 106 with electronic configuration of certain parameters, enables a higher quality of image processing at a low cost than has been previously possible. Further by controlling certain parameters, for example the number of channels used, power consumption can be altered and temperature can be changed.

The imaging device 300 according to some embodiments is configured to allow system configurability and adaptability in real time based on information regarding one or more defective pixels (defective pixel data). This is done for example by comparing a current pixel performance dataset of one or more pixels of a transducer array of an imaging device with a baseline pixel performance dataset of the same pixels as will be explained in further detail below.

Now addressing FIG. 3A in more detail, FIG. 3A is a schematic diagram of an imaging device 300 with selectively adjustable features, according to some embodiments. The imaging device 300 may be similar to imaging device 100 of FIG. 1, or to imaging device 202 of FIG. 2, by way of example only. As described above, the imaging device may include an ultrasonic medical probe. FIG. 3A depicts transducer(s) 302 of the imaging device 300. As described above, the transducer(s) 302 may include arrays of transducer elements (FIG. 1, 104) that are adapted to transmit and receive pressure waves (FIG. 2, 210). In some examples, the imaging device 300 may include a coating layer 322 that serves as an impedance matching interface between the transducers 302 and the human body, or other mass or tissue through which the pressure waves (FIG. 2, 210) are transmitted. In some cases, the coating layer 322 may serve as a lens when designed with the curvature consistent with focal length desired.

The imaging device 300 may be embodied in any suitable form factor. In some embodiments, part of the imaging device 300 that includes the transducers 302 may extend outward from the rest of the imaging device 100. The imaging device 300 may be embodied as any suitable ultrasonic medical probe, such as a convex array probe, a micro-convex array probe, a linear array probe, an endovaginal probe, endorectal probe, a surgical probe, an intraoperative probe, etc.

In some embodiments, the user may apply gel on the skin of a living body before a direct contact with the coating layer 322 so that the impedance matching at the interface between the coating layer 322 and the human body may be improved. Impedance matching reduces the loss of the pressure waves (FIG. 2, 210) at the interface and the loss of the reflected wave travelling toward the imaging device 300 at the interface.

In some examples, the coating layer 322 may be a flat layer to maximize transmission of acoustic signals from the transducer(s) 102 to the body and vice versa. The thickness of the coating layer 322 may be a quarter wavelength of the pressure wave (FIG. 2, 210) to be generated at the transducer(s) 102.

The imaging device 300 also includes a control circuitry 106, such as one or more processors, optionally in the form of an application-specific integrated circuit (ASIC chip or ASIC), for controlling the transducers 102. The control circuitry 106 may be coupled to the transducers 102, such as by way of bumps. As described above, the transmit channels 108 and receive channels 110 may be selectively alterable or adjustable, meaning that the quantity of transmit channels 108 and receive channels 110 that are active at a given time may be altered such that, for example, one or more pixels determined to be defective are not used. For example, the control circuitry 106 may be adapted to selectively adjust the transmit channels 108 and receive channel 110 based on pixels to be tested for defects, and/or based on pixels determined to be defective.

In some examples, the basis for altering the channels may be a mode of operation, the mode of operation may in turn be chosen based on which pixels are determined to be defective, and optionally based on the type of defect of each defective pixel.

The imaging device may also include one or more processors 326 for controlling the components of the imaging device 100. One or more processors 326 may be configured to, in addition to control circuitry 106, at least one of control an activation of transducer elements, process electrical signals based on reflected ultrasonic waveforms from the transducer elements or generate signals to cause a restoration of an image of an object being imaged by one or more processors of a computing device, such as computing device 112 of FIG. 1 or 216 of FIG. 2. One or more processors 326 may further be adapted to perform other processing functions associated with the imaging device. The one or more processors 326 may be embodied as any type of processors 326. For example, the one or more processors 326 may be embodied as a single or multi-core processor(s), a single or multi-socket processor, a digital signal processor, a graphics processor, a neural network compute engine, an image processor, a microcontroller, a field programmable gate array (FPGA), or other processor or processing/controlling circuit. The imaging device 100 may also include circuit(s) 328, such as Analog Front End (AFE), for processing/conditioning signals, and an acoustic absorber layer 330 for absorbing waves that are generated by the transducers 102 and propagated towards the circuits 328. That is, the transducer(s) 102 may be mounted on a substrate and may be attached to an acoustic absorber layer 330. This layer absorbs any ultrasonic signals that are emitted in the reverse direction (i.e., in a direction away from coating layer 322 in a direction toward port 334), which may otherwise be reflected and interfere with the quality of the image. While FIG. 3A depicts the acoustic absorber layer 330, this component may be omitted in cases where other components prevent a material transmission of ultrasound in the reverse direction.

The analog front end 328 may be embodied as any circuit or circuits configured to interface with the control circuitry 106 and other components of the imaging device, such as the processor 326. For example, the analog front end 328 may include, e.g., one or more digital-to-analog converters, one or more analog-to-digital converters, one or more amplifiers, etc.

The imaging device may include a communication unit 332 for communicating data, including control signals, with an external device, such as the computing device (FIG. 2, 216), through for example a port 334 or a wireless transceiver. The imaging device 100 may include memory 336 for storing data. The memory 336 may be embodied as any type of volatile or non-volatile memory or data storage capable of performing the functions described herein. In operation, the memory 336 may store various data and software used during operation of the imaging device 100 such as operating systems, applications, programs, libraries, and drivers.

In some examples, the imaging device 100 may include a battery 338 for providing electrical power to the components of the imaging device 100. The battery 338 may also include battery charging circuits which may be wireless or wired charging circuits (not shown). The imaging device may include a gauge that indicates a battery charge consumed and is used to configure the imaging device to optimize power management for improved battery life. Additionally or alternatively, in some embodiments, the imaging device may be powered by an external power source, such as by plugging the imaging device into a wall outlet.

Referring now to FIG. 3B, a more detailed view is shown of the internal components 360 within the housing of the imaging device 300 of FIG. 3A, minus the coating layer 322. The front portion 360 may, in the shown example of FIG. 3B, include a lens 366, below which lies the microelectromechanical (MEMs) transducer(s) 302, coupled to ASIC 106 as shown. The ASIC is in turn coupled to a printed circuit board (PCB) which may include some or all electronic components of the imaging device, such as battery 338, memory 336, communication circuitry 332 and processor 326, along with AFE 328 and port 334 of FIG. 3A. The assembly including the lens 366, transducer(s) 302, ASIC 106 and PCB 360 may rest on a series of layers including one or more adhesive layers 362, an absorber 330, and a reflector, such as a tungsten reflector.

It should be appreciated that, in some embodiments, various components of the imaging device as shown in FIGS. 3A and 3B may be omitted from an imaging device, or may be included in other components separate from the imaging device. For example, in one embodiment, the one or more processors 326 may include some or all of the control circuitry 106. Additionally or alternatively, some or all of the components may be integrated into or form part of a system-on-a-chip (SoC) or multichip package.

Figure 4:
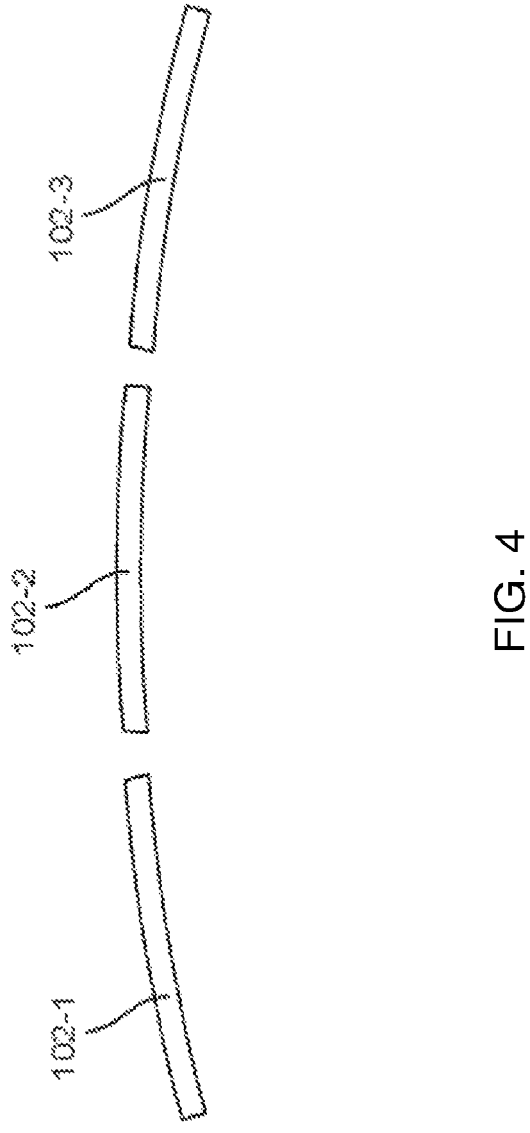
FIG. 4 is a side view of a curved transducer array, according to an example of the principles described herein.

FIG. 4 is a side view of a transducer array 102, according to an example of the principles described herein. As described above, the imaging device (FIG. 1, 100) may include an array of transducers 102-1, 102-2, 102-3, each with their own array of transducer elements (FIG. 1, 104). In some examples, the transducers 102 may be curved (as suggested for example in FIG. 3B) so as to provide a wider angle of the object (FIG. 2, 214) to be imaged.

Figure 5:
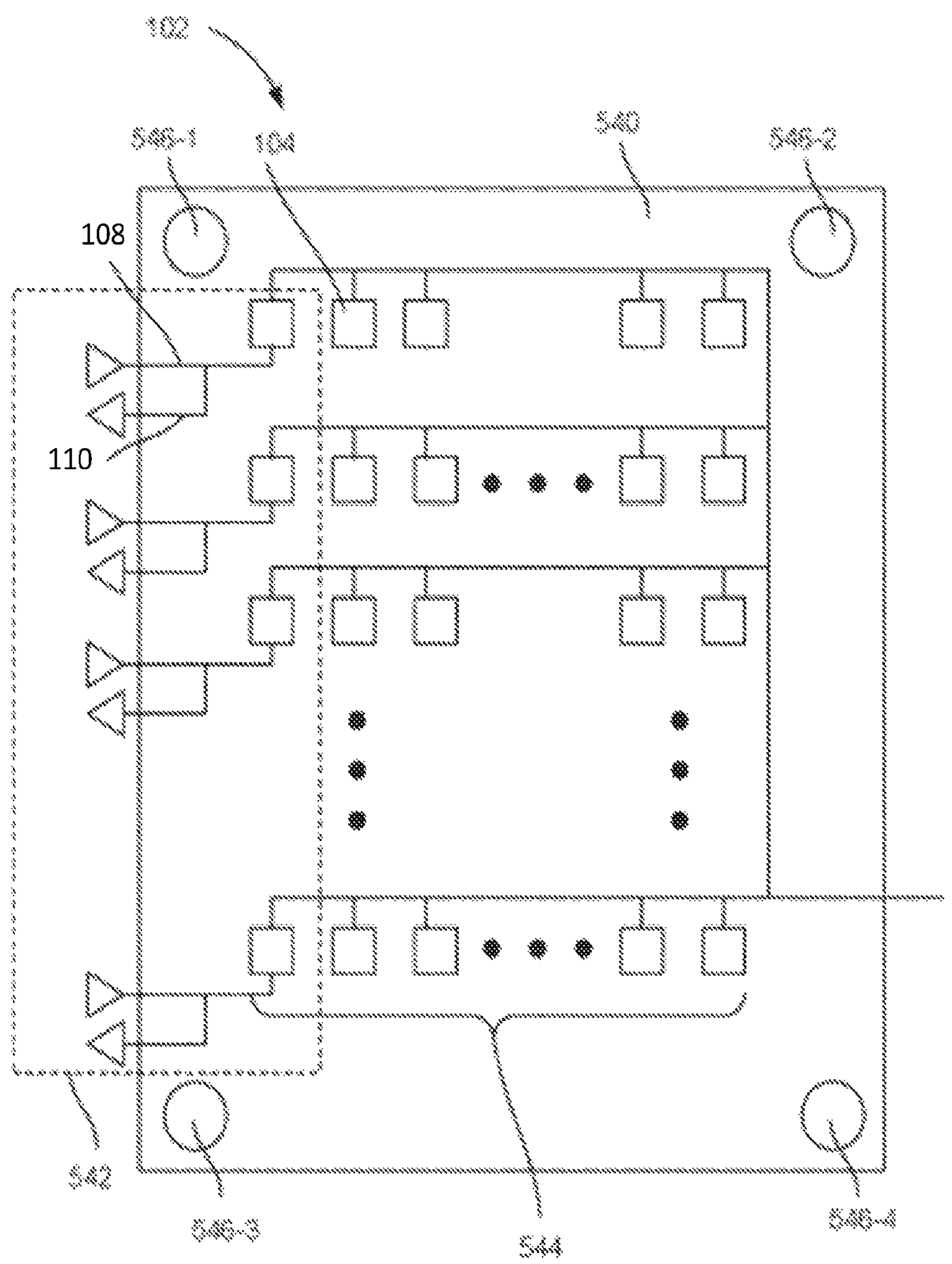
FIG. 5 is a top view of a transducer, according to an example of the principles described herein.

FIG. 5 depicts a top view of a single transducer 102. As depicted in FIG. 5, the transducer 102 may include a transducer substrate 540 and one or more transducer elements 104 arranged thereon. Unlike the conventional systems that use bulk transducer elements, the transducer element 104 may be formed on a wafer and the wafer may be diced to form multiple transducers 102. This process may reduce the manufacturing cost since the transducers 102 may be fabricated in high volume and at low cost.

In some examples, the diameter of the wafer may range between 8~12 inches and many transducer element 104 arrays may be batch manufactured thereon. Furthermore, in some examples, the control circuitry (FIG. 1, 106) for controlling the transducer elements 104 may be formed such that each transducer element 104 is connected to the matching integrated circuits, e.g., receive channels (FIG. 1, 108) and transmit channels (FIG. 1, 106) in close proximity, preferably within 25 μm-100 μm. For example, the transducer 102 may have 1024 transducer elements 104 and be connected to a matching control circuitry (FIG. 1, 106) that has the appropriate number of transmit and receive circuits for the 1,024 transducer elements 104.

A transducer element 104 may have any suitable shape such as, square, rectangle, ellipse, or circle. As depicted in FIG. 5, in some examples, the transducer elements 104 may be arranged in a two dimensional array arranged in orthogonal directions. That is, the transducer element 104 array may be an M×N array with N columns 542 and M rows 544.

To create a line element, a column 542 of N transducer elements 104 may be connected electrically in parallel. Then, this line element may provide transmission and reception of ultrasonic signals similar to those achieved by a continuous transducer element that is almost N times longer than each transducer element 104. This line element may be called a column or line or line element interchangeably. An example of a column of piezo elements is shown in FIG. 5 by the reference number 542. Transducer elements 104 are arranged in a column 542 in this example and have associated transmit driver circuits (part of transmit channel) and low noise amplifiers which are part of the receive channel circuitry.

Although not explicitly shown, the transmit and receive circuitry may include multiplexing and address control circuitry to enable specific elements and sets of elements to be used. It is understood that transducers 102 may be arranged in other shape such as circular, or other shapes. In some examples, each transducer elements 104 may be spaced 250 μm from each other center to center.

In the transducer 102 of the present specification, it is advantageous to design a line element using a plurality of identical transducer elements 104, where each element may have its characteristic center frequency. When a plurality of the transducer elements 104 are connected together, the composite structure (i.e. the line element) may act as one line element with a center frequency that consists of the center frequencies of all the pixels. In modern semiconductor processes, these center frequencies match well to each other and have a very small deviation from the center frequency of the line element. It is also possible to mix several pixels of somewhat different center frequencies to create a wide bandwidth line compared to lines using only one central frequency.

In some examples, the transducers 102 may include one or more temperature sensors 546-1, 546-2, 546-3, 546-4 to measure the temperature of the transducer 102. While FIG. 5 depicts temperature sensors 546 disposed at particular locations, the temperature sensors 546 may be disposed at other locations on the transducer 102 and additional sensors may be disposed at other locations on the imaging device (FIG. 1, 100).

The temperature sensors 546 may, according to one embodiment, trigger the selective adjustment of channels (FIG. 1, 108, 110). That is, as described above, temperatures within a handheld portable imaging device (FIG. 1, 100) may rise above a predetermined temperature. Accordingly, the temperature sensors 546 may detect a temperature of the device at the transducer 102 surface, which is a surface that contacts a patient if the temperature sensors 546 detect a temperature greater than a threshold amount, for example a user-established temperature or a temperature set by a regulatory authority, a signal may be passed by the controller (FIG. 3, 324) to power down all or some of the transmit channels (FIG. 1, 108) and/or receive channels (FIG. 1, 110) or to set all or some of the transmit channels (FIG. 1, 108) and/or receive channels (FIG. 1, 110) in a low power state. Placing the temperature sensor 546 on the transducers 102 is beneficial in that this is near the surface that contacts the patient and is therefore provides data regarding the temperature at the interface where a user may notice, or be affected by excess heat. Should one or more pixels be determined to be defective, data from the temperature sensors may further be useful in correlating for example the incidence of defects, including optionally the incidence of certain types of defects, with the data from the temperature sensors.

FIG. 5 also depicts the terminals of the transducer elements 104. That is, each transducer element 104 may have two terminals. A first terminal may be a common terminal shared by all transducer elements 104 in the array. The second terminal may connect the transducer elements 104 to the transmit channels (FIG. 1, 108) and receive channels (FIG. 1, 110). This second terminal may be the terminal that is driven and sensed for every transducer element 104 as shown symbolically for those transducer elements 104 in the first column. For simplicity, the second terminal is only indicated for those transducer elements 104 in the first column. However, similar terminals with the associated transmit channels 108 and receive channels 110 populate the other transducer elements 104 in the array. The control circuitry (FIG. 1, 106) using control signals can select a column 542 of transducer elements 104 by turning on respective transmit channels (FIG. 1, 108) and receive channels (FIG. 1, 110) and turning off the channels (FIG. 1, 108, 110) in other columns 542. In a similar manner, it is also possible to turn off particular rows, or even individual, transducer elements 104.

Figure 6:
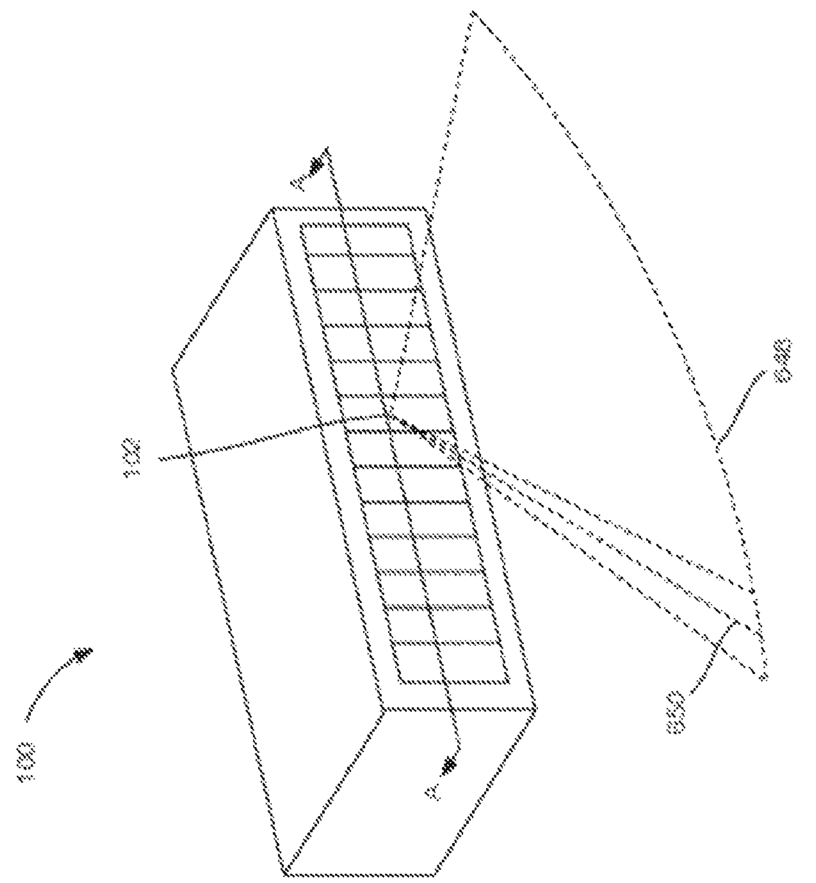
FIG. 6 is an isometric view of an imaging device and scan lines of a frame, according to an example of the principles described herein.

FIG. 6 is an isometric view of an imaging device 100 and scan lines 650 of a frame 648, according to an example of the principles described herein. A frame 648 refers to a single still image of an organ, or other object to be imaged. The frame 648 may correspond to an image of a cross-sectional plane through the object. A frame 648 is made up of individual scan lines 650. That is, a frame 648 may be viewed as an image, and a scan line is an individual layer or slice of that image. Depending on the resolution, a particular frame 648 may include different numbers of scan lines 650 ranging from less than a hundred to many hundreds.

To form a frame 648, a transducer 102, using beamforming circuitry, may focus pressure waves of different transducer elements (FIG. 1,104), for example, those in a particular column (FIG. 5, 542) to a particular focal point. The reflected signals collected by these transducer elements (FIG. 1, 104) are received, delayed, weighted, and summed to form a scan line 650. The focal point of interest may then be changed based on beam-forming technology, and the process repeated until an entire frame 648, consisting of for example 100-200 scan lines 650 is generated.

Figure 7:
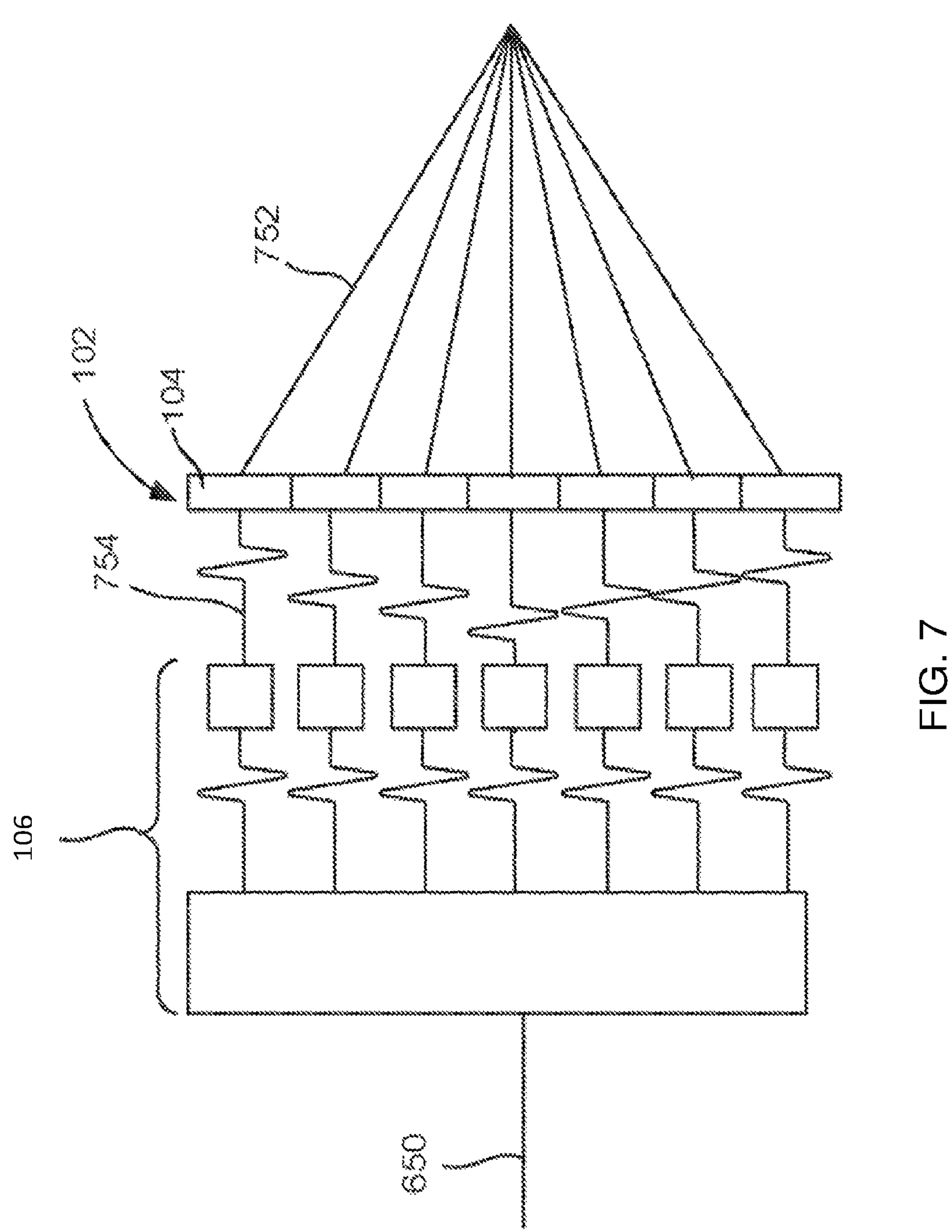
FIG. 7 illustrates the formation of a scan line, according to an example of the principles described herein.

FIG. 7 illustrates the formation of a scan line 850, according to an example of the principles described herein. Specifically, FIG. 7 is a cross-sectional view of one transducer 102 taken along the line A-A from FIG. 6. Specifically, FIG. 7 depicts the transducer elements 104 that make up the transducer 102. In FIG. 7, just one transducer element 104 of a transducer 102 is indicated with a reference number for simplicity. Moreover, note that the transducer elements 104 depicted in FIG. 7 may represent a top transducer element 104 of a column (FIG. 5, 542) with other transducer elements 104 extending into the page. FIG. 7 also depicts circuitry that may be found in the control circuitry (FIG. 1, 106 or FIG. 3, 106) to form a scan line. Note also that for simplicity FIG. 7 only depicts seven transducer elements 104, and seven respective columns (FIG. 5, 542). However as described above, a transducer 102 may include any number of transducer elements 104, for example, 128 columns (FIG. 5, 542), with each column (FIG. 5, 542) having 32 transducer elements 104 disposed therein.

To form a scan line 650, reflected ultrasonic waveforms 752 are received from a number of transducer elements 104, for example from each transducer element 104 in a column (FIG. 5, 542). These waveforms 752 are converted into electrical signals. In some examples, electrical signals from transducer elements 104 in a column (FIG. 5, 542) may be combined into a composite signal 754 which is passed to the control circuitry 106. As each composite signal 754 is received at a different time due to different transmission lengths, the control circuitry 106 delays each composite signal 754 such that they are in phase. The control circuitry 106 then combines the adjusted signals to form a scan line 650.

Figure 8:
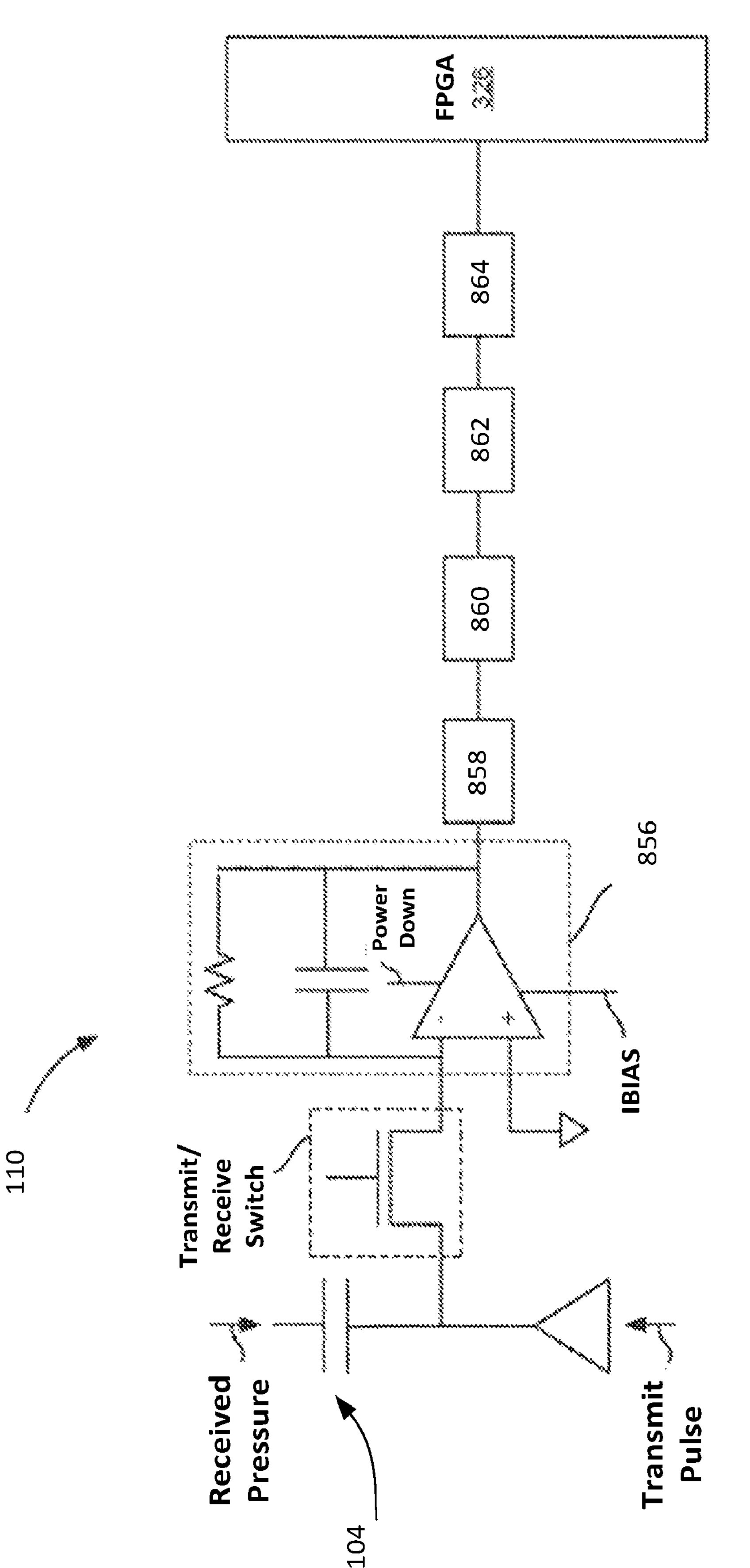
FIG. 8 depicts a receive channel, according to an example of the principles described herein.

FIG. 8 depicts a receive channel 110, according to an example of the principles described herein. The receive channel 110 is coupled to a transducer element (FIG. 1, 104) to receive the reflected pressure wave (FIG. 2, 210). FIG. 8 also depicts the connection between the transducer element (FIG. 1, 104) and the transmit channel (FIG. 1, 110). In one example, the transmit channel (FIG. 1, 108) goes towards a high impedance during a receive operation at the node where the received pressure and transmitted pulse meet. Specifically, the reflected pressure wave is converted to an electrical charge in the transducer element 104 and this is converted to a voltage by a low noise amplifier (LNA) (856). The LNA (856) is a charge amplifier, where charge is converted to an output voltage. In some examples, the LNA (856) has programmable gain, where the gain can be changed in real time.

The LNA (856) converts charge in the transducer to a voltage output and also amplifies the received echo signal. A switch (transmit/receive switch) connects the LNA (856) to the transducer element 104 in the receive mode of operation.

The output of this LNA (856) then is connected to other components to condition the signal. For example, a programmable gain amplifier (PGA) (858) adjusts the magnitude of the voltage and provides a way to change the gain as a function of time and may be known as a time gain amplifier (TGA). As the signal travels deeper into the tissue, it is attenuated.

Accordingly, a larger gain is used to compensate, which larger gain is implemented by the TGA. The bandpass filter 860 operates to filter out noise and out of band signals. An analog to digital converter (ADC) 862 digitizes the analog signal to convert the signal to the digital domain such that further processing can be done digitally. Data from the ADC 862 is then digitally processed at a demodulation unit 864 and passed to the FPGA 326 to generate the scan line (FIG. 6, 650) as depicted in FIG. 7. in some implementations, the demodulation unit 864 can be implemented elsewhere, for example in the FPGA. The demodulation unit frequency-shifts the carrier signal to baseband with two components in quadrature (I and Q), for further digital processing in some examples, the analog to digital converter (ADC) 862 may implement a successive-approximation-register (SAP) architecture to reduce latency of the ADC 862. That is, as the ADC 862 is turned off and on repeatedly, it needs to have little to no latency so as to not delay signal processing following turning on.

Figure 9A:
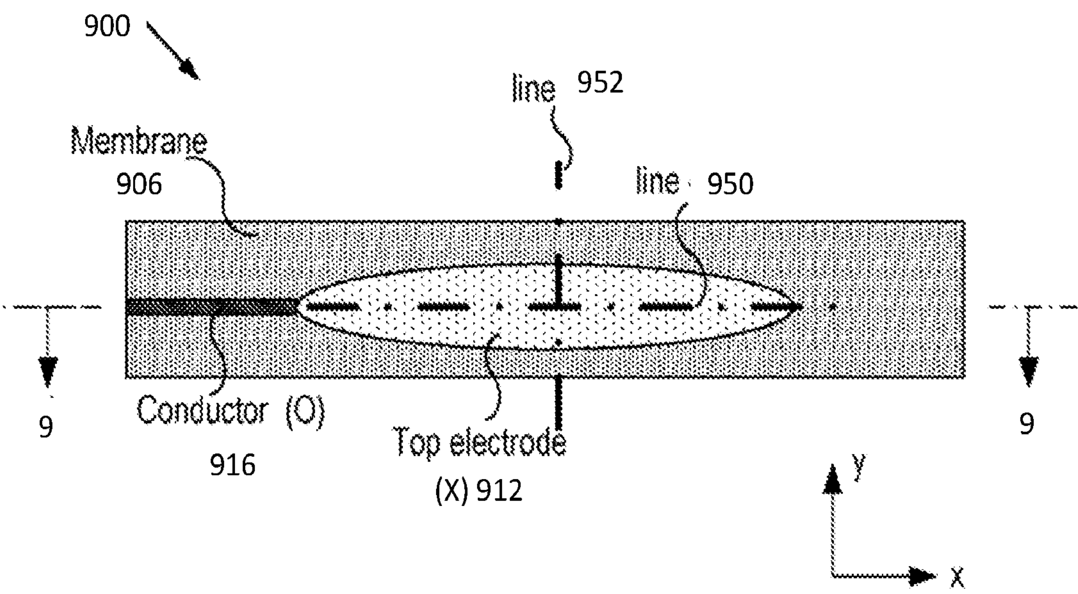
FIG. 9A depicts a top plan view of a pixel according to an embodiment.
Figure 9B:
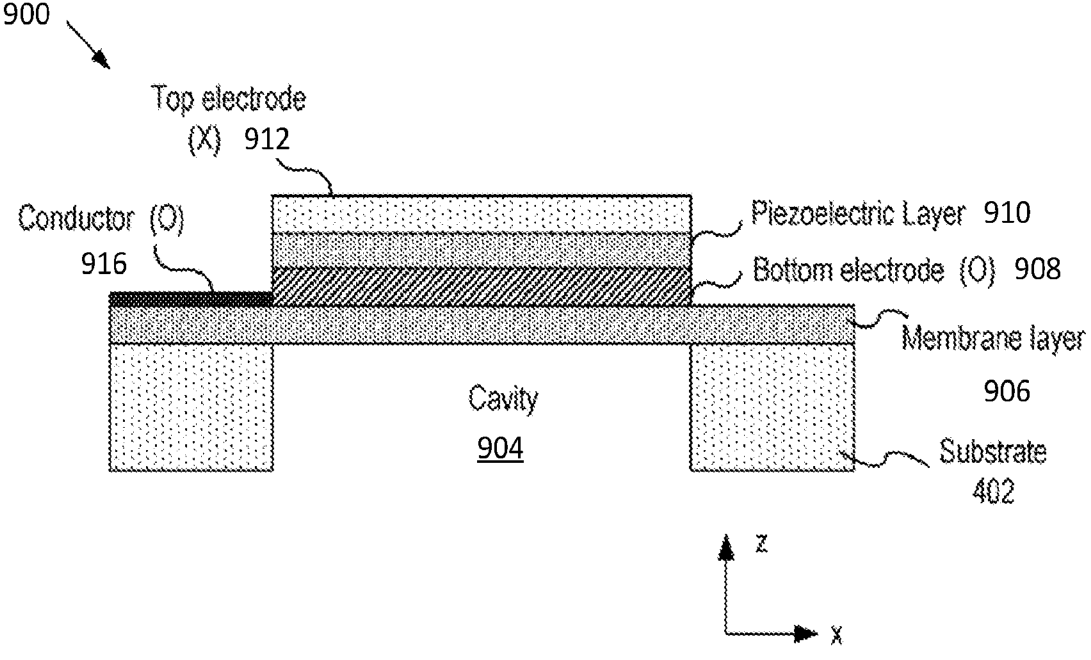
FIG. 9B depicts a cross sectional view of an pixel, taken along a direction 4-4 in FIG. 10A, according to an embodiment.

Reference is now made to FIGS. 9A and 9B. FIG. 9A is a top plan view of an pixel 900 according to an embodiment, and FIG. 9B is a cross sectional view of the pixel 900 of FIG. 9A, taken along the lines 9-9. The pixel may include a membrane layer 906 supported on a substrate 902, a bottom electrode (O) 908 disposed on the membrane layer (or "membrane") 906; a piezoelectric layer 910 disposed on the bottom electrode (O) 908; and a top electrode (X) 912 disposed on the piezoelectric layer 910. The substrate 902 and the membrane 906 may optionally correspond to a monolithic body. Cavity 904 may be defined by a surface of membrane 906 facing away from the bottom electrode 908 and side walls of the substrate extending in a direction away from the bottom electrode 908.

In some embodiments, the cavity 904 may be filled with a gas at a predetermined pressure or an acoustic damping material to control the vibration of the membrane 906. In some embodiments, the geometrical shape of the projection area of the top electrode 912 may be configured in a generally concave or convex shape having characteristic geometric parameters to control the dynamic performance and capacitance magnitude of the piezoelectric pixel 900.

In some embodiments, each pixel 900 may be a piezoelectric pixel and include a piezoelectric layer formed of at least one of PZT, KNN, PZT-N, PMN-Pt, AlN, Sc—AlN, ZnO, PVDF, and LiNiO3. In alternative embodiments, each pixel 900 may be a capacitive micromachine pixel.

In FIG. 9A, each pixel 900 is shown to have a rectangular shape in a top plan view thereof. In some embodiments, each pixel may include a top electrode that has an elliptical shape in a top plan view thereof. Hereinafter, "shape of the top electrode" refers to a top plan view of the top electrode (top referring to a view of a surface of the top electrode that faces away from the cavity. The shape of the top electrode may include any shape, such as a square, circle, rectangle, oval, etc. It may preferably be symmetrical, although embodiments are not so limited.

Figure 10:
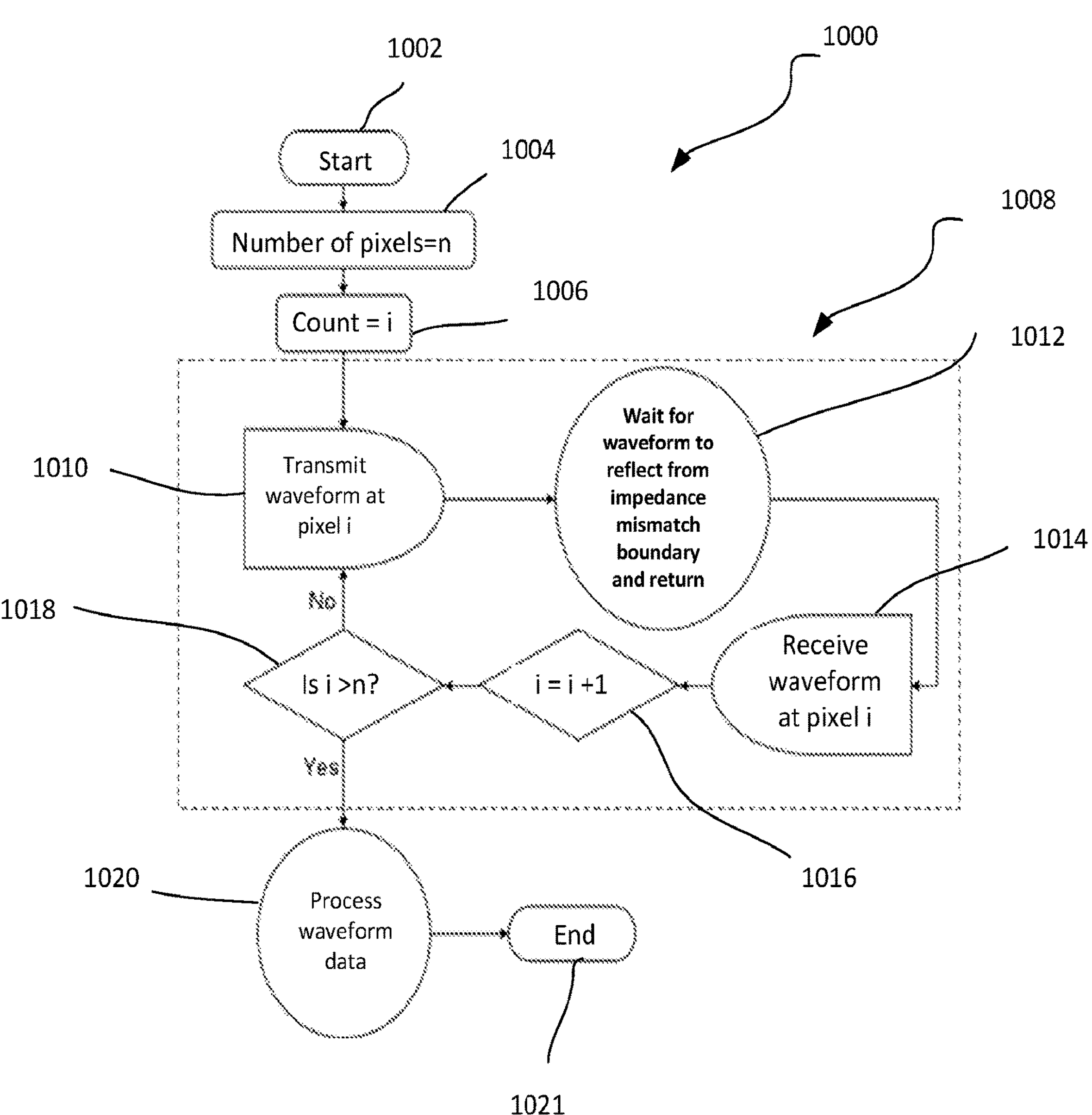
FIG. 10 is a flow diagram of a method according to an embodiment.

Reference is now made to the flow chart 1000 of FIG. 10 for a transducer array in an imaging device having n pixels. After start 1002, based on n pixels (at 1004—for example, the imaging device may determine that there are n pixels), for each individual pixel i of the array (at 1006—for example, the imaging device may maintain an increment counter for each pixel i up to n pixels), the imaging device may, at operation 1008, in general, perform a receive cycle including activation of pixels to generate transmitted ultrasonic waveforms therefrom and an associated collection of reflected ultrasonic waveforms based on the transmitted ultrasonic waveforms.

According to the shown embodiment of FIG. 10, a receive cycle is shown corresponding to operation 1008 that includes activating each pixel i of n pixels separately. In particular, at operation 1010, the imaging device may cause an ultrasonic waveform to be transmitted at pixel i. After an elapsed time period (at 1012), the imaging device may, at operation 1014, receive a reflected ultrasonic waveform that was generated (is based on) the transmitted ultrasonic waveform transmitted by way of pixel i at operation 1010. The reflected ultrasonic waveform may be generated as a consequence of the transmitted ultrasonic waveform reflecting off an impedance mismatched boundary. Where the imaging device is in an imaging mode, the impedance mismatched boundary may correspond to various surfaces of a target to be imaged, such as an organ in a human or animal body. Where the imaging device is in a "health check" mode, as described in the context of some embodiments herein, the impedance mismatched boundary may be between the lens (such as coating layer 322 of FIG. 3A or lens 366 of FIG. 3B) and another medium, such as air, or any other medium that presents an impedance mismatch with that of the lens. More details regarding the quick text mode will be provided below as the description progresses.

At operation 1016, the imaging device may increment the value of i by one, and, at operation 1018, the imaging device may determine whether the incremented value of i is above n. If i is not greater than n, the imaging devices may repeat operations 1010-1018 until i>n. Once i>n, the imaging device may process received ultrasonic waveforms from all pixels i up to n pixels. According to one embodiment, the imaging device may terminate its receive cycle through pixels i=i to n after determining that i>n, although, according to an alternative embodiment, the imaging device may continue to receive ultrasonic waveforms based on transmitted ultrasonic waveforms of a subsequent receive cycle while processing the reflected ultrasonic waveforms of a prior receive cycle. According to one embodiment, the imaging device may process a received ultrasonic waveform while receiving a subsequent received ultrasonic waveform from one or more other pixels.

Processing a received ultrasonic waveform may, according to one embodiment, include processing as explained by way of example in the context of FIG. 8. Namely, processing a received ultrasonic waveform may include converting the same into an electrical charge in the transducer element (104), and further converting the electrical charge into a voltage by a low noise amplifier (LNA) (856). The LNA may further amplify the received echo signal as noted in the context of FIG. 8 above. Processing the received ultrasonic waveform may further include conditioning the signal output form the LNA, for example using a programmable gain amplifier (PGA) (858) to adjust the magnitude/amplitude of the voltage, and/or for example using a time gain amplifier (TGA) to change the gain as a function of time.

After processing, for example as noted above, according to some embodiments, in order to characterize a performance of an pixel, an electrical signal that corresponds to the received ultrasonic waveform may be used to generate a time-domain signal waveform that corresponds to the performance of an pixel (a performance dataset), for example for each pixel i up to n pixels. According to some embodiments, the performance dataset may initially be generated for a "healthy" pixel, that is, an pixel whose performance exhibits no or negligible defects (hereinafter a "baseline pixel performance dataset"). Performance datasets may be generated by the imaging device for example by causing a pixel i or group of pixels to go through a receive cycle or loop where the reflected ultrasonic waveform is based on an impedance mismatch between the lens of the imaging device, and another medium (hereinafter "matching layer") such as air, or any other medium that presents an impedance mismatch with the lens of the imaging device that does not require alignment with the transducer array.

According to some embodiments, a group of pixels going through a receive cycle may show additive performance signal waveforms determined by the number of pixels in the group and the distance to the quick test medium boundary (boundary between medium one and medium two) and the shape of the same. Performance signal waveforms for a group of pixels, when one or more pixels in the group is defective, may show changed performance in the defective pixel(s) and may show changed performance in the neighboring pixels of the defective pixel(s), in this manner pinpointing the defective pixel(s). To ensure the neighbors to the defective pixel(s) are not also defective, additive performance signal waveforms may be determined by subtracting the defective pixel waveform.

Subsequent to the generation, and storage of a baseline pixel performance dataset for pixel i, a same pixel i may be caused by the imaging device to go through a current pixel performance receive cycle (e.g. operations 1010, 1012 and 1014) as a "health check" measure prior to use of the imaging device for target image generation. The health check routine applied to a pixel i may result in the generation of a current pixel performance dataset (similar to the baseline pixel performance dataset, but performed at a later time, therefore possibly at a time when pixel i's performance may have undergone deterioration and may thus indicate a defect). The health check is to allow a characterization of pixel performance, including for example a determination of defective pixels prior to use of an imaging device for imaging a target, and a determination as to recommended next steps based on any defect found regarding pixels. The determination of defective pixels may include, according to some embodiments, an identification of the defective pixels, such as through an indication of a location of the defective pixels (for example by providing the address of a group of or of each of the defective pixels), an indication of a type of defect(s) for the defective pixels, to name a few.

The health check (or "quick test") may be performed against the same matching layer as the one used to generate the baseline pixel performance dataset. After its generation, the current pixel performance dataset of the pixel may be compared to its baseline pixel performance dataset in order to determine whether the pixel receive performance has changed from the baseline, and in particular to determine whether such pixel now exhibits a defect. More detail will be provided regarding the performance dataset as the description progresses.

According to an alternative embodiment as compared with the embodiment of FIG. 10, instead of an individual pixel i being caused to generate a transmitted ultrasonic waveform, one pixel at a time, for the purpose of the current pixel performance dataset generation, groups of pixels may be caused by the imaging device to collectively transmit a series of waveforms simultaneously. For example, an imaging device such as imaging device 300 of FIG. 3A includes AFE 328, which may be capable of outputting a plurality transmit channels at a time, such as, for example, up to 64 channels of data at a time. To measure the performance of each pixel of a 4096 pixel array in the quickest time possible (to perform a health check using a receive cycle), according to one embodiment, groups of 64 single pixels may be caused to transmit an ultrasonic waveform and then receive a reflected ultrasonic waveform as a result. This group of 64 may be switched to the next group of 64 sequentially until all 4096 pixels are captured for a transmit receive event (i.e., until all 4096 pixels have gone through a receive cycle in groups), the above corresponding to 64 receive cycles, with each receive cycle firing 64 pixels. Therefore, in this embodiment, 64 "loops" are said to be involved (64×64=4096). The respective peak values of the electrical signals corresponding to received ultrasonic waveforms of each receive cycle (or each loop) may then be used by the imaging device to plot a heat map of pixel sensitivity. By firing groups of pixels simultaneously, rather than single pixels one by one, the test time may be reduced by the number of pixels fired simultaneously in the group. For example, a test of 4096 pixels fired one by one will take 4096 iterations, while firing groups of 64 for the same 4096 pixels will take 64 iterations, reducing the test time by a factor of 64. A limitation is in the size of the group of pixels that the transmit and receive electronics can simultaneously capture. By firing a group of pixels, a baseline performance signal waveform for the group is determined as an additive function of the single pixel performance signal waveforms of the group and the quick test medium. Defective element pixels in the group are determined by measuring deviations from this additive function. In the above particular embodiment, where each receive cycle or loop corresponds to a group of 64 pixels, each pixel may transmits a 4-cycle (to be distinguished from a receive cycle), 3.6 MHz ultrasonic waveform.

The thus transmitted ultrasonic waveform (which would be a composite of all transmitted ultrasonic waveforms from each pixel in the loop) may reflects off the imaging device lens/air boundary, and return to and be received at the same 64 pixels that had just been caused to transmit.

Due to the switching time from transmit to receive, the beginning of an electronic signal corresponding to a reflected ultrasonic waveform may be clipped or cut off. Low-noise amplifiers (LNAs) on the ASIC may further have a settling time after switching on, and the processing of the received ultrasonic waveform and its conversion into a voltage signal typically occurs during this time. These effects must be considered. For example, if the received ultrasonic waveform is clipped, more cycles of the transmitted waveform may be required or the signal may be characterized/analyzed after the clipped portion in the time domain. If the received ultrasonic waveform occurs while the LNAs on the ASIC are settling, a removal of the settling artifacts observed in the waveform can be done with filters such as a high pass filter or subtraction of a modeled LNA settling signal. According to some embodiments, as part of processing of a received ultrasonic waveform, amplifier settings (such as a PGA) may be set to increase the amplitude of the received signal above the amplitude of the LNA power on and settling amplitude.

Figures 11A, 11B:
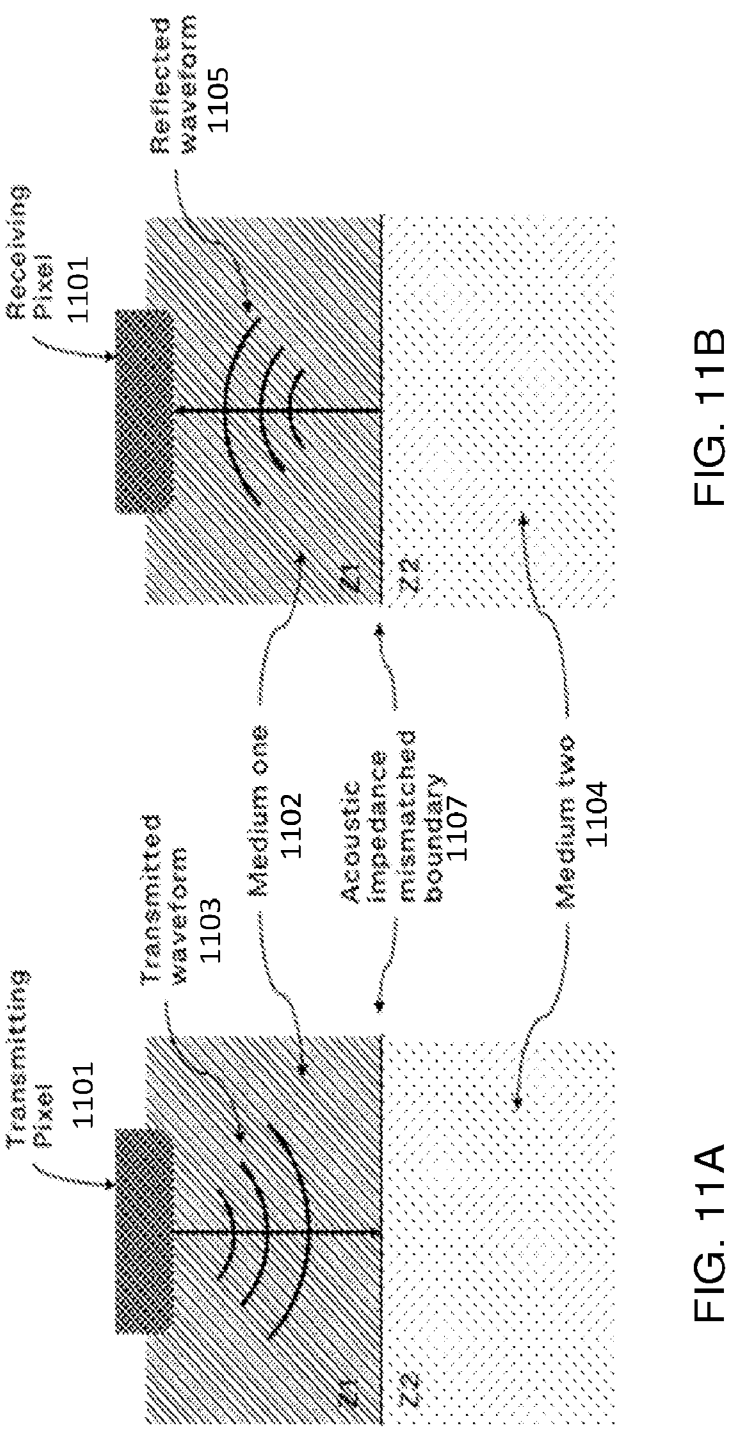
FIGS. 11A-11B depict, respectively, an ultrasonic transducer pixel transmission and receive path in an acoustic medium with an acoustic impedance mismatched boundary, according to an embodiment.

FIGS. 11A and 11B illustrate in greater detail the transmit and receive paths for a single pixel within a transducer array, such as one associated with transducer 302 of FIG. 3B, corresponding, respectively, to operations 1010 and 1014 of FIG. 10. FIG. 11A shows an pixel i, for example one in a transducer such as transducer(s) 302 of FIG. 3B, in the process of transmitting an ultrasonic waveform 1103 through a first medium 1104, such as lens 366 of FIG. 3B (medium one), having an acoustic impedance $Z_1$. The transmitted waveform propagates through the first medium toward a second medium 1106 (medium two), which in the case of FIGS. 11A and 11B corresponds to the matching layer, with the matching layer, having an acoustic impedance $Z_2$ different from $Z_1$. The matching layer could include air, for example. Because the acoustic impedances $Z_1$ and $Z_2$ are not the same or "matched," there is an acoustic impedance mismatched boundary 1107 between medium one and medium two.

FIG. 11B shows a receive path for the reflected waveform 1105 that arises as a consequence of transmitted waveform reflecting off the acoustic impedance mismatched boundary 1107. The reflected waveform is received at pixel i 1101 as shown. The performance of pixel i 1101 may result from a receive cycle such as receive cycle 1008 of FIG. 10 described above in the context of a health check.

Figures 12A, 12B, 12C:
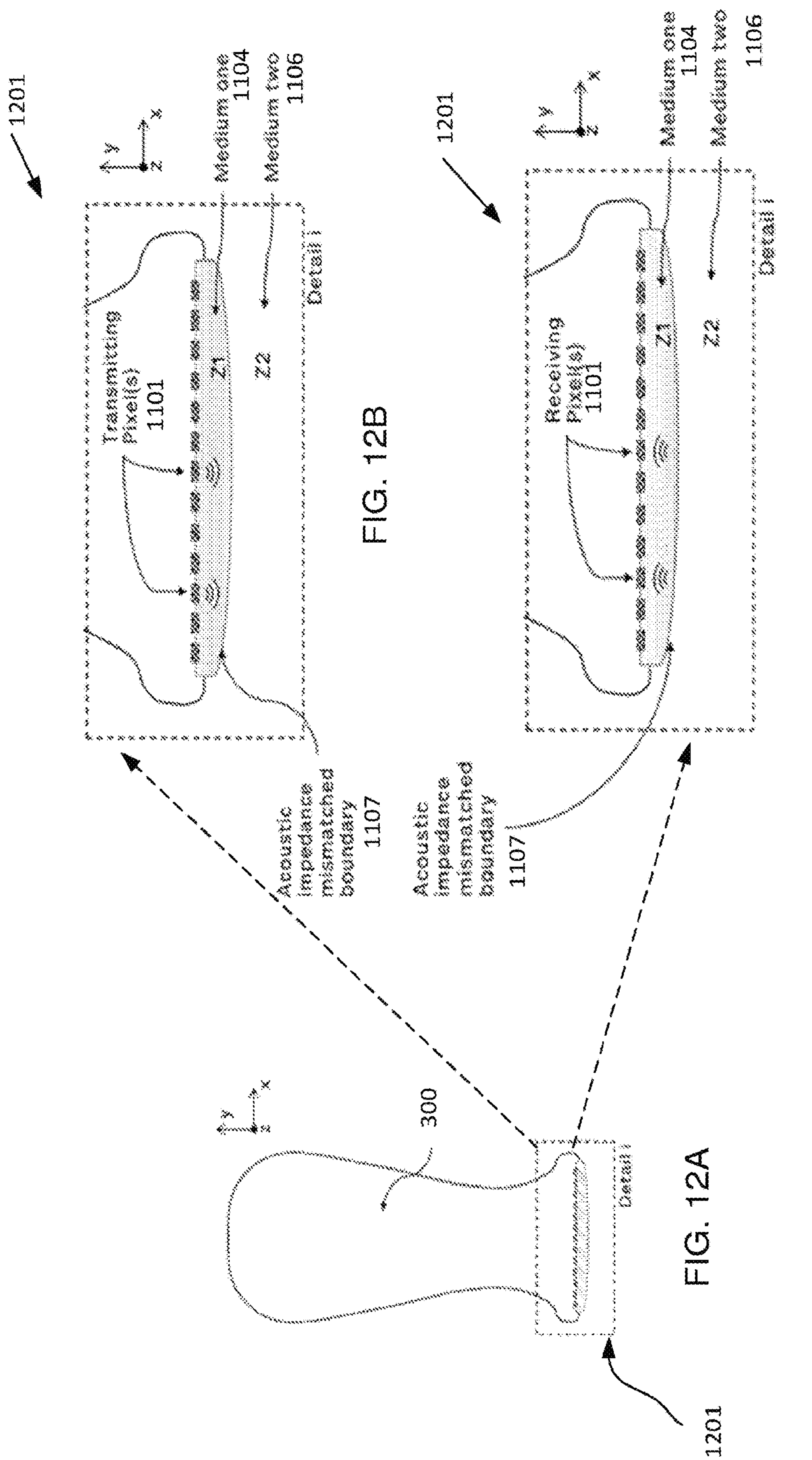
FIG. 12A depicts a side cross-sectional view of an ultrasonic probe according to an embodiment
FIGS. 12B-12C depict the head portion of the probe of FIG. 12A in, respectively, a transmit mode and a receive mode according to an embodiment where no pixel defects exist.

FIG. 12A is a side cross-sectional view of an embodiment of an ultrasonic probe or imaging device 300 configured to implement an example method of characterizing the performance of one or more pixels of an ultrasonic imaging device.

FIGS. 12B and 12C are figures similar to FIGS. 11B and 11C, showing a detail of a head portion 1201 of the imaging device 300 of FIG. 12A.

With reference to FIG. 12A, an ultrasonic imaging device 300 with transmit and receive capability for a pixel array is illustrated, with a transducer 302 or pixel array located within the dashed line box boundary of FIG. 12A at head portion 1201. FIG. 12B shows a magnified view of the head portion 1201 including pixel array of FIG. 12A, transmitting an acoustic waveform 1103 through a first medium (medium one) 1104, having an acoustic impedance $Z_1$. A second medium 1106 (medium two), having an acoustic impedance $Z_2$, borders medium one. Because the acoustic impedances $Z_1$ and $Z_2$ are not the same or "matched," there is an acoustic impedance mismatched boundary 1107 between medium one 1104 and medium two 1106. FIG. 12C shows the same magnified side view of the head portion 1201 including pixel array as in FIG. 12B, where the transmitted acoustic signal illustrated in FIG. 12B has reflected at 1105 off the impedance mismatched layer 1107 between medium one 1104 and medium two 1006. As shown in FIG. 7C, this reflected waveform is traveling back in the direction of the pixel i that transmitted the initial acoustic waveform, whereupon pixel i receives the reflected waveform.

Some embodiments provide an apparatus and method to characterize both a transmit and a receive performance of a pixel element of an ultrasonic imaging probe simultaneously. An impedance mismatched boundary may occur in the design of an ultrasonic imaging device, such as, an interface between the material boundary of a lens of the imaging device and air. With such an interface, no reflector target, test fixtures or alignment is required in order to perform a method of characterizing a performance of one or more pixels of the ultrasonic imaging device. However, use of fixtures and a reflector target to perform the method of characterizing other than air does not prohibit the apparatus or method functionality of embodiments.

The detection of a signal reflected from an impedance mismatched boundary indicates the performance for a transmit receive cycle of an pixel as noted above, for example in relation to FIG. 10. Characterization of performance as referred to herein may pertain to a determination of defects, for example of one or more defects per pixel. Defect in the context of an pixel as referred to herein may pertain to any defect that may affect the performance of that pixel, including a defect in the pixel itself, a defect affecting the path of a waveform transmitted from the pixel or reflected toward the pixel (such as defects concerning the lens 366 of FIG. 3B).

Characterization of performance of an pixel may include generating a performance dataset that corresponds to a combined amplitude of both transmit and receive ultrasonic waveforms for an pixel. The imaging device may detect the latter combined amplitude as a receive ultrasonic waveform amplitude that may be approximately equivalent to a sum of the transmit ultrasonic waveform amplitude and a reflection coefficient (based on the impedance mismatched boundary) multiplied by the transmit ultrasonic waveform amplitude, as well as any losses in the first medium and the second medium for the total pathlength of the waveform from transmission to reception. Characterization of performance according to some embodiments may involve a comparison of this amplitude for one or more pixels recorded as a single value, or as a data set of values over time against, respectively, the baseline single value or the baseline data set of values varying over time.

An absence of a received ultrasonic waveform at a particular pixel may indicate that the particular pixel is defective in at least one of transmitting or receiving. An ability to confirm transmission of one or more ultrasonic waveforms by way of one or more pixels may allow, during characterization of pixel performance, separating an characterization of receive performance from a characterization of transmit performance. For example, where one or more pixels are transmitting ultrasonic waveforms, and at least one pixel is receiving an ultrasonic waveform, with the presence of a received signal on at least one pixel, transmit is confirmed and a receive failure is determined by lack of a signal on other pixels. Pixels transmitting ultrasonic waveforms tend to be additive, and a single pixel receiving the ultrasonic waveform from the transmitting pixels confirms transmit of all transmitting pixels by presence of the complete additive ultrasonic waveform. If pixels are not transmitting, the received ultrasonic waveform will be reduced. A scenario could exist in which a received waveform is reduced due to a defective, but not failed, receiver, rather than a defective transmitter. Thus, with multiple receivers and transmitters, confidence is gained in determining whether receive or transmit is defective.

An alternative embodiment of performance characterization for an pixel includes an apparatus and method for detecting a transmit failure of an pixel when two or more pixels are confirmed functioning with receive. A function of receive may be determined by the presence of a transmitted signal or presence of a LNA settling waveform. In the case of no transmitted signal, no LNA settling waveform, and no receive waveform, a determination of transmit or receive failure cannot be made. In this embodiment, the control circuitry such as control circuitry 106 may send signals to a group of pixels to request the pixels to transmit ultrasonic waveforms. In response to a determination that a received ultrasonic waveform detected at a given pixel of the group of pixels has an amplitude less than received ultrasonic waveforms detected at one or more neighboring pixels that are functioning for transmit and receive, the imaging device may determine that the given pixel is defective with transmit. In this embodiment, to distinguish from a defect of the given pixel with receive (a defect causing reduced or no pixel sensitivity on receive for the given pixel), the given pixel may be sent a signal by the control circuitry to transmit an ultrasonic waveform alone, and, if a received ultrasonic waveform is not detected at the given pixel, a transmit failure may be confirmed.

An alternative embodiment of performance characterization for an pixel includes an apparatus and method to identify defects in a lens or matching layer, such as air bubbles, delamination (poor adhesion), or debris in the lens or matching layer. A transmit receive cycle requires a signal to travel uninterrupted along the path designed for the health check between the transmitting pixel(s) and the acoustic impedance mismatched boundary. Air bubbles, debris, or poor adhesion between lens or matching layer boundaries result in a path change for the signal and typically cause a decrease in received amplitude or a time dependent change detected in the received signal. The time and amplitude change in the signal may be used to infer lens or matching layer defect(s).

Capturing the time of propagation for an acoustic signal from transmit to receive in a known medium is directly proportional to distance of travel (path of the acoustic signal or ultrasonic waveform). Capturing the signal from one or more pixels transmitting and receiving in a known medium, such as a lens, such as, for example, lens 366 of FIG. 3B, may allow a determination of a shape or configuration of the medium along the path of travel of the signal (or ultrasonic waveform/acoustic signal). Some embodiments include determining a shape of a medium to infer any deviations from its intended (baseline) design or confirmation of the design. Deviation from an intended baseline design of a lens for example may lead to determination of a defective pixel where the propagation path of an ultrasonic waveform transmitted from the pixel and reflected back to the pixel from a mismatched impedance boundary includes a defect, such as, for example, an air bubble, delamination or debris as noted above. By "shape" or "configuration" of a medium, what is intended herein is a shape or configuration of one or more portions of a medium, such as a shape or configuration of or at a surface of a medium (including for example a shape of boundary 1017), or including a shape or configuration of the entire medium.

Determining the shape of a medium and obtaining time of propagation for an acoustic signal transmitting and receiving from one or more pixels may be used to indicate a position of the pixel(s). These principles of signal propagation in a known medium can therefore be leveraged to detect and identify a range of defects impacting ultrasonic imaging device pixel performance.

Figure 13:
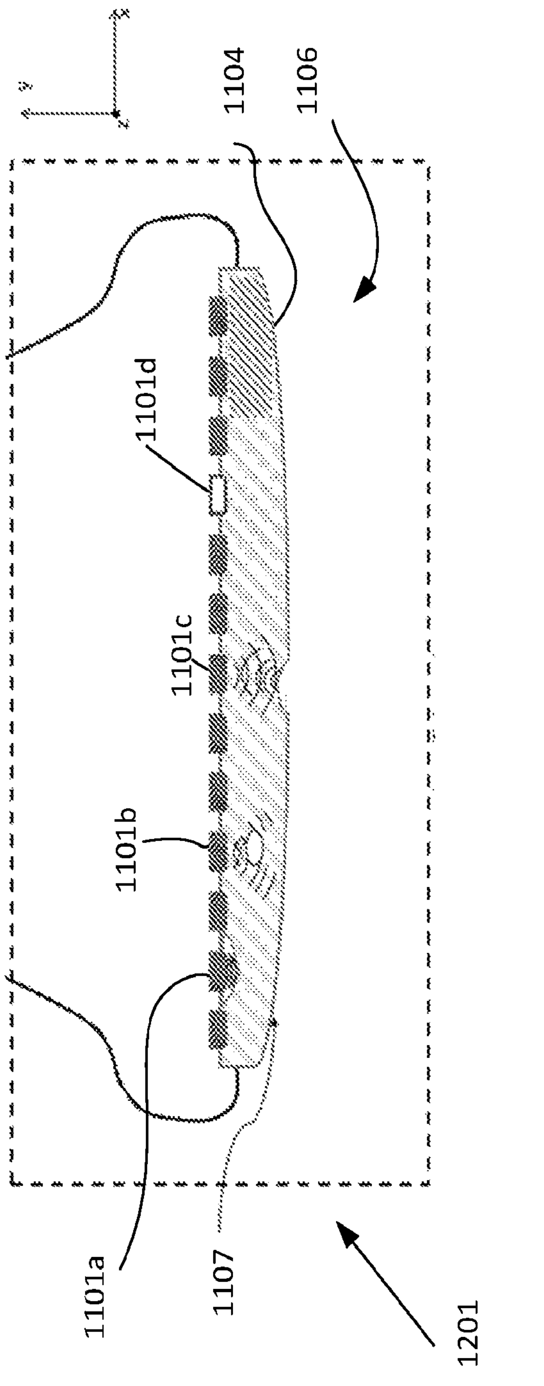
FIG. 13 depicts the head portion of the probe of FIG. 12A, in, respectively, a transmit mode and a receive mode acoustic medium obstructed by examples of defects, according to an embodiment where some pixel defects exist.

Reference now is made to FIG. 13, which illustrates a view of a head portion 1201 of an imaging device similar to that of FIGS. 12B and 12C, but with defects that may manifest in pixel performance, such as defects in the lens (or first medium) 1104 or matching layer (or second medium) 1106, debris in the lens or matching layer, or poor adhesion at lens or matching layer boundaries.

For example, pixel 1101*a* of the array of pixels at head portion 1201 is shown as exhibiting a delamination (i.e., separation) from medium one 1104, such that a gap exists between pixel 1101*a* and medium one 1104. Another pixel 1101*b* is shown as being located such that an air bubble 1302 is in the propagation path of an ultrasonic waveform transmitted from the pixel, thus adversely impacting that the performance of the pixel. Another pixel 1101*c* is shown as having been located such that an irregularity in the surface of medium one is in the propagation path of an ultrasonic waveform transmitted from the pixel, such that the mismatched boundary layer is interrupted. Another pixel 1101*d* is shown as being inactive, perhaps due to some local structural or electrical failure concerning the pixel. With respect to these various examples of defects affecting pixel performance, measurable or detectable characteristics associated with the reflected waveform (such as time and amplitude change or phase shift as compared with a baseline pixel performance dataset of the pixel) may be used to infer or deduce the nature or source of the particular lens or matching layer defect(s).

Figure 14A:
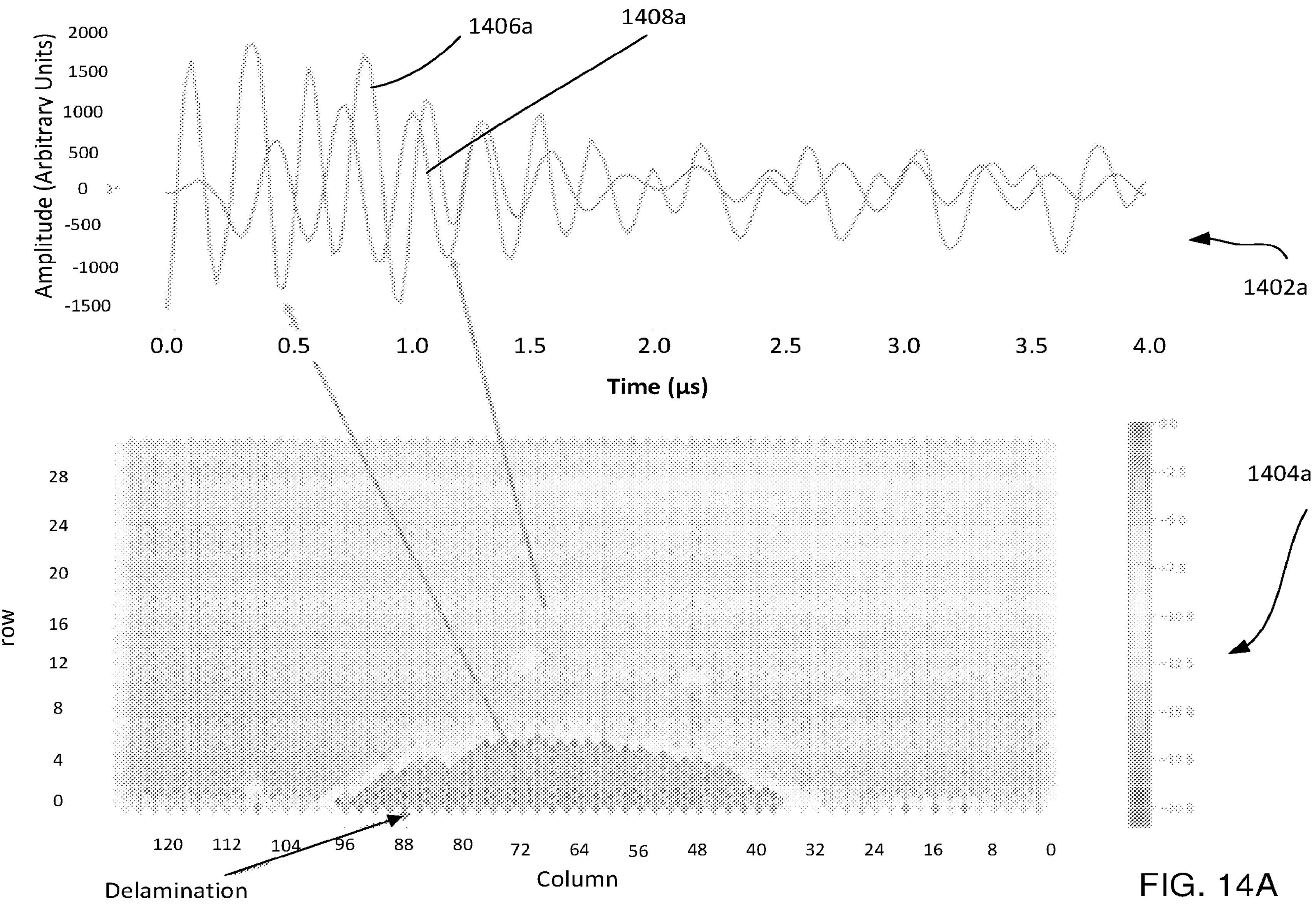
FIG. 14A-14D show respective pairs of a graph and corresponding pixel array performance image corresponding to various pixel defects when implementing a health check routine according to some embodiments.
Figure 14B:
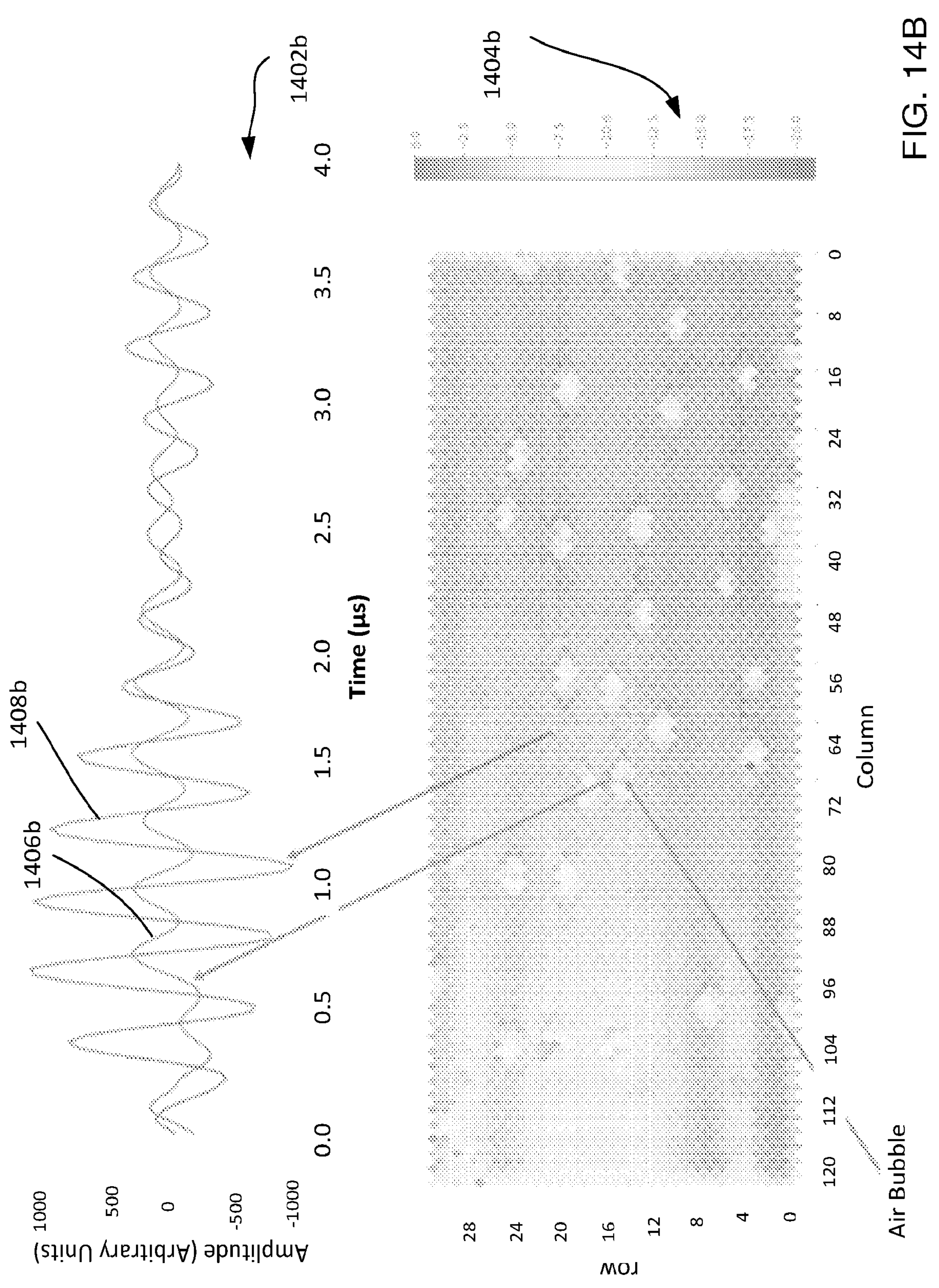
Figure 14C:
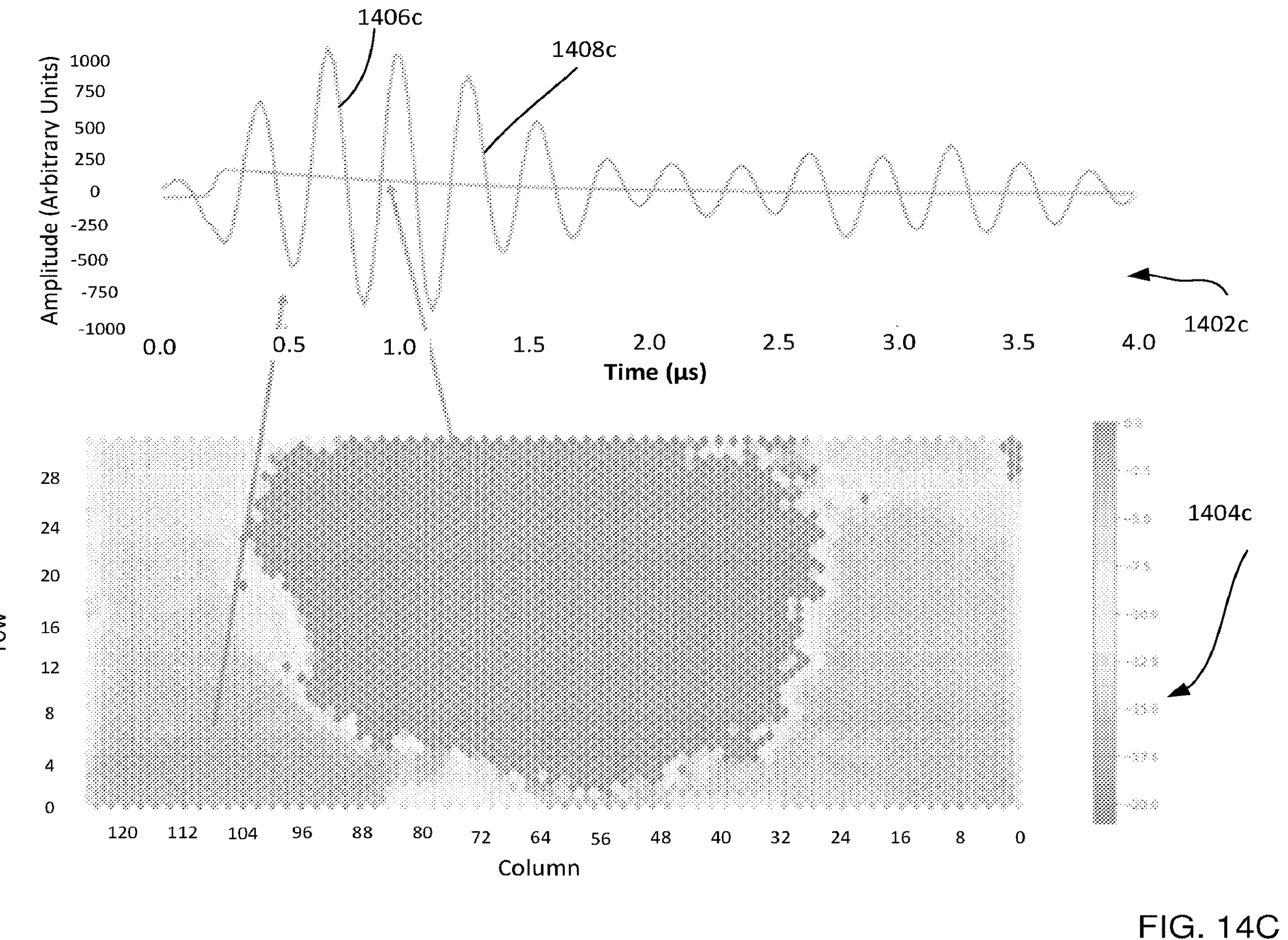
Figure 14D:
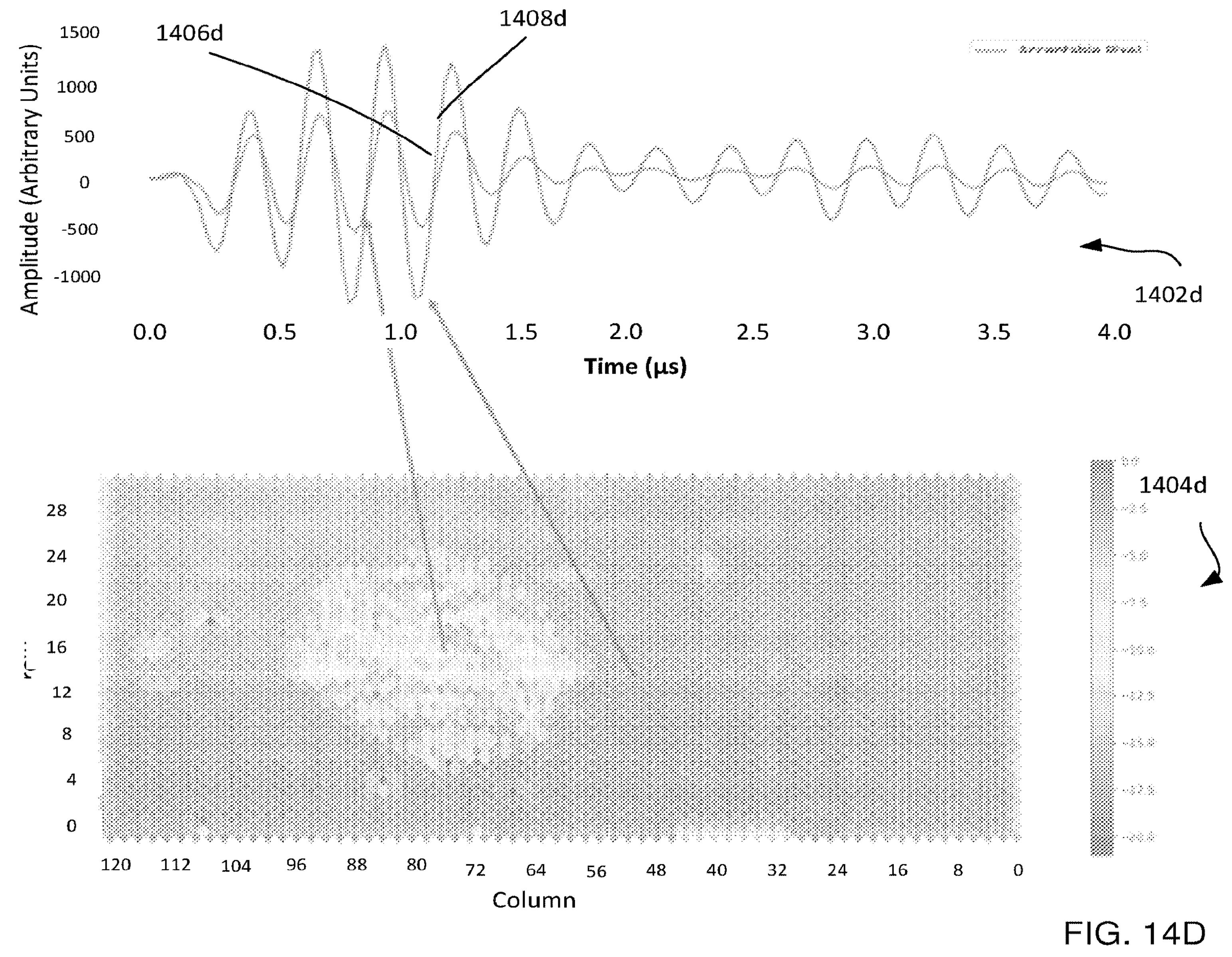

Reference in this context is now made to FIGS. 14A-14D, which show respective pairs of graphs 1402 and 1404 pertaining to pixel performance defects as explained in the context of FIG. 13 above for pixels 1101*a*-1101*c* (FIGS. 14A-14C), and further for a pixel underfill defect (FIG. 14D).

Referring first to FIG. 14A, graph 1402*a* is a depiction of a baseline pixel performance dataset 1408*a* and of a current pixel performance dataset 1406*a* for respective pixels in a pixel array 1404*a* of an ultrasonic imaging probe. The respective pixels are located within the array as indicated by way of arrows pointing to an intersection of a corresponding row and column pairs showing coordinates of the pixel for which each performance dataset has been graphed in graph 1402*a*. In graph 1402*a*, the y axis shows amplitudes in arbitrary units (as graph 1402*a* is provided for illustrative purposes only), and the x axis shows time in microseconds. As suggested in FIG. 14A, lens delamination may be detected by the imaging device by the presence of a larger amplitude and longer ringing waveform for current pixel performance dataset 1406*a* as compared with the amplitude and ringing waveform of baseline pixel performance dataset 1408*a*.

Referring first to FIG. 14B, graph 1402*b* is a depiction of a baseline pixel performance dataset 1408*b* and of a current pixel performance dataset 1406*b* for respective pixels in a pixel array 1404*b* of an ultrasonic imaging probe. The respective pixels are located within the array as indicated by way of arrows pointing to an intersection of a corresponding row and column pairs showing coordinates of the pixel for which each performance dataset has been graphed in graph 1402*b*. In graph 1402*b*, the y axis shows amplitudes in arbitrary units (as graph 1402*b* is provided for illustrative purposes only), and the x axis shows time in microseconds. As suggested in FIG. 14B, lens bubbles are detected by the presence of a decreased amplitude and changing ringdown pattern in the waveform as well as a shift in the phase of the reflected waveform for current pixel performance dataset 1406*b* as compared with the amplitude, ringdown pattern and phase of baseline pixel performance dataset 1408*b*.

Referring first to FIG. 14C, graph 1402*c* is a depiction of a baseline pixel performance dataset 1408*c* (in the shown embodiment, depicted as a waveform, although embodiments are not so limited, and include any set of data that is representative of the baseline pixel performance) and of a current pixel performance dataset 1406*c* (again, in the shown embodiment, depicted as a waveform, although embodiments are not so limited, and include any set of data that is representative of the current pixel performance) for respective pixels in a pixel array 1404*c* of an ultrasonic imaging probe. The respective pixels are located within the array as indicated by way of arrows pointing to an intersection of a corresponding row and column pairs showing coordinates of the pixel for which each performance dataset has been graphed in graph 1402*c* (again, in the shown embodiment, any pixel performance may be depicted as a waveform, although embodiments are not so limited, and include any set of data that is representative of pixel performance). In graph 1402*c*, the y axis shows amplitudes in arbitrary units (as graph 1402*c* is provided for illustrative purposes only), and the x axis shows time in microseconds. As suggested in FIG. 14C, a pixel failure may be identified by the presence of an electrical signal for the receiver, rise and decay, but no acoustic signal from the pixel for current pixel performance dataset 1406*c* as compared with the behavior of baseline pixel performance dataset 1408*c*.

Referring first to FIG. 14D, graph 1402*d* is a depiction of a baseline pixel performance dataset 1408*d* and of a current pixel performance dataset 1406*d* for respective pixels in a pixel array 1404*d* of an ultrasonic imaging probe. The respective pixels are located within the array as indicated by way of arrows pointing to an intersection of a corresponding row and column pairs showing coordinates of the pixel for which each performance dataset has been graphed in graph 1402*a*. In graph 1402*a*, the y axis shows amplitudes in arbitrary units (as graph 1402*d* is provided for illustrative purposes only), and the x axis shows time in microseconds. As suggested in FIG. 14D, underfill, or the presence of material underneath a pixel, may be detected by a current pixel performance dataset 1406*d* that resembles an acceptable pixel, but with a decreased amplitude and change in ringdown characteristics of the waveform as compared with the amplitude and ringdown characteristics of the baseline pixel performance dataset 1408*d*.

Any of the above-described embodiments or variations thereof may be applied to an ultrasonic imaging device after deployment of the same in the field to determine the imaging device's viability or functionality in-field. The imaging device or probe may be initially subjected to a health check prior to its operation for imaging purposes in order to characterize pixel performance for one or more pixels thereof. According to some embodiments, the imaging device may be subjected to a health check for pixel performance characterization periodically, and any measured changes, relative to the initial baseline test results, may indicate the probe's viability or performance degradation.

Figure 15:
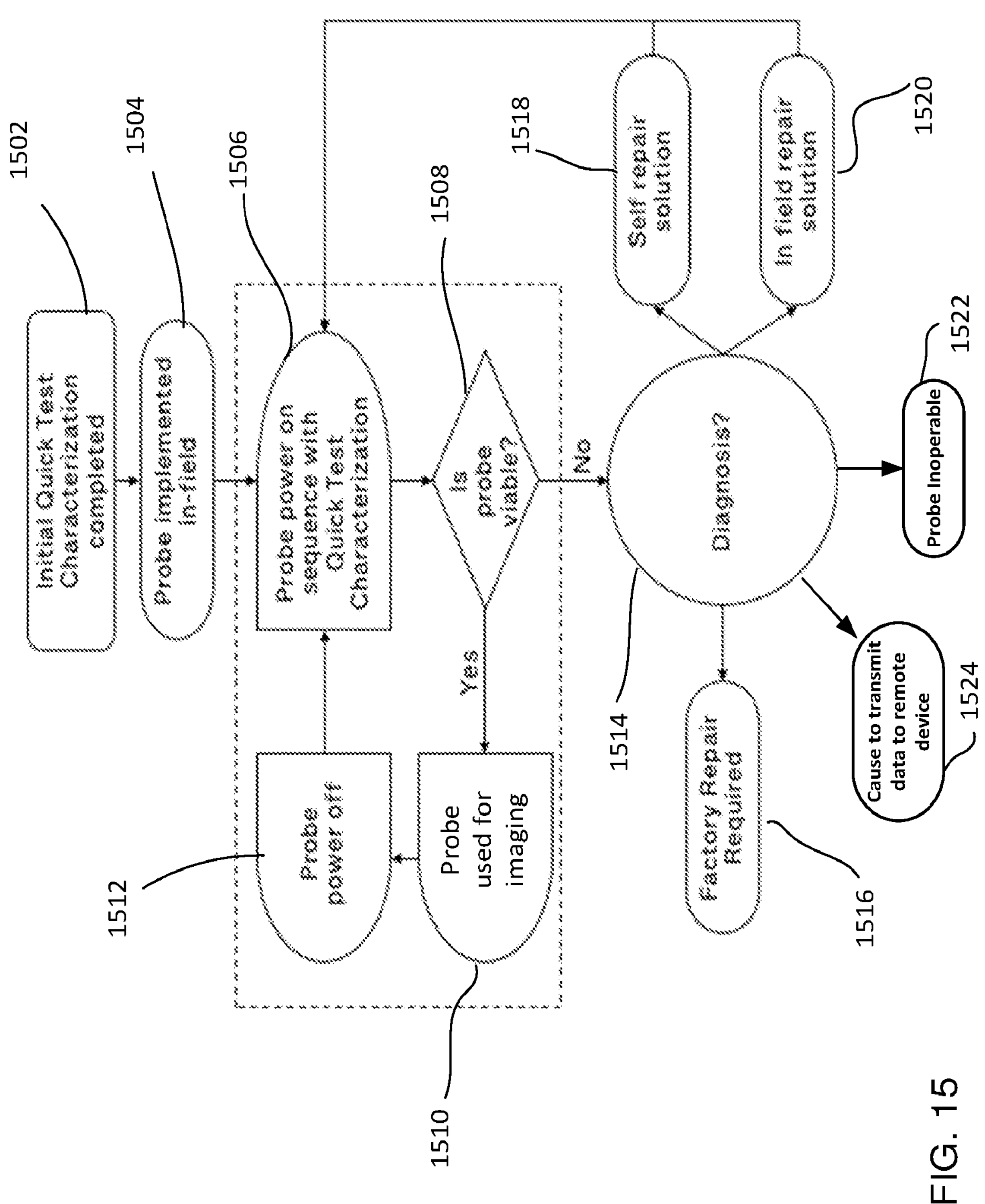
FIG. 15 is a flow diagram of a method according to another embodiment.

A method for implementing health check of transducer array pixel performance in an ultrasonic imaging device or probe is illustrated in the flow chart 1500 FIG. 15 according to one embodiment. As shown in FIG. 15, at operation 1502, an initial, or baseline, health check may be completed on a particular ultrasonic imaging device, for example, upon first-ever power-up of the device. The health check allows the characterization of the performance of one or more pixels of the imaging device and the generation of a baseline pixel performance dataset, such as a time domain waveform, that may correspond to the baseline pixel performance or one pixel i or of a group of pixels. At operation 1504, the imaging device may be "deployed in the field," that is, the imaging device may be about to be used to obtain images of a target, such as an organ in a living body. At operation 1506, the imaging device may be powered on, and subjected to a health check characterization routine executed according to some embodiments. The health check characterization routine for a pixel may include, as already noted above, using an electrical signal that corresponds to a received ultrasonic waveform at the pixel i (where the received ultrasonic waveform is based on a reflected ultrasonic wave transmitted by pixel i) to generate a time-domain signal waveform that corresponds to the performance of the pixel (a performance dataset), for example up to n pixels. The n pixels may be all of the pixels of the imaging device, or some of the pixels of the imaging device. The baseline pixel performance dataset may be generated in the same manner at operation 1502, when the imaging device is, for example, still at the factory. Performance datasets may be generated by the imaging device for example by causing a pixel i or group of pixels to go through a receive cycle or loop where the reflected ultrasonic waveform is based on an impedance mismatch between the lens of the imaging device, and another medium (hereinafter "matching layer") such as air, or any other medium that presents an impedance mismatch with the lens of the imaging device that does not require alignment with the transducer array. Subsequent to the generation, and storage of a baseline pixel performance dataset for pixel i, a same pixel i may be caused by the imaging device to go through a receive cycle as a "health check" measure or routine prior to use of the imaging device for target image generation ("on the field").

At operation 1508, the imaging device may ascertains whether it is viable for use, for example, whether a sufficient number of pixels above a predetermined numerical threshold are operating properly, and/or whether a number of pixels with defective performance at predetermined X-Y coordinates in the array of pixels are below another predetermined numerical threshold. "Properly" as used in the latter sentence may include instances where one or more pixels may have undergone a change in performance, but where such pixels are still useful to allow the imaging device to function in at least one imaging mode. For example, even with defective pixels, an imaging device may be deemed viable if it is capable of functioning in at least one of a one-dimensional imaging mode, a two-dimensional imaging mode, a three-dimensional imaging mode, a Doppler imaging mode, a linear imaging mode, or a sector imaging mode).

For example, in or more imaging modes, the imaging device may implement may activate one or more pixels for transmit and subsequent receive operation based on defective pixel dataset, for example based on the type of defect, and/or the location of the defective pixels.

For example, in one or more imaging modes, the imaging device may select to implement a frame reconstruction algorithm to reconstruct a frame corresponding to an image of a target being imaged taking into account missing data from pixels determined to be defective by way of the health check routine. If the imaging device knows the location of defective pixels, it may use such information in order to reconstruct a frame corresponding to the image of the target by extrapolating data based on receive ultrasonic waveforms from functioning pixels into data that would have corresponded to the defective pixels. For example, an imaging device may select to implement a frame reconstruction algorithm where defective pixels are determined to have been randomly scattered through the pixel array, and may elect otherwise if a contiguous cluster of pixels is determined to be defective.

If the imaging device is deemed viable, it may, at operation 1510, perform imaging, and, where it is subsequently powered off at operation 1512, it may again undergo a health check routine at operation 1506 as already described above.

On the other hand, if the imaging device deems itself not viable, for example where a threshold number of pixels in the transducer array are determined to be defective or otherwise not operating as designed, the imaging device may, at operation 1514, cause information regarding the determination of one or more defective pixels (defective pixel data) to be communicated to a user. Such information, according to some embodiments, may include an identification of the one or more defective pixels, such as through an indication of a location of the one or more defective pixels (for example by providing the address of a group of or of each of the one or more defective pixels), an indication of a type of defect(s) for the one or more defective pixels, to name a few.

Communication of defective data may be by way of a voice indication or a visual indication (for example, through text indication, and/or through a defective pixel heatmap indication, etc.). The audio indication may be transmitted by way of a speaker, and the visual indication may be by way of a display. The speaker and the display may each be part of the imaging device, or they may be distinct from the imaging device, in which case the communication may be by way of a wireless or wired connection.

The imaging device may further, based on the diagnosis, suggest recommended next steps to a user based on the determination of defective pixels. Thus, the diagnosis may further direct the user to perform at self-repair solution at operation 1518 (such as, for example, taking the imaging device circuitry through a resetting function, turning the device off and back on, etc.), an in-field repair solution at operation 1520 (such as, for example, through the use of a material to repair or fill a cracked lens surface), and/or a factory repair solution at operation 1516, depending on the nature and extent of the identified pixel defect(s).

If a minimum threshold number of pixels in the transducer array are ascertained to be defective (a threshold amount that may be predetermined or preset by the manufacturer), the imaging device may change its status to “inoperative” or “not viable” and suspend the user’s ability to operate the probe until sufficient repair(s) have been undertaken, as suggested by way of operation 1522.

According to some embodiments, the imaging device may, at operation 1524, cause information regarding the determination of defective pixels to be sent to a remove device for further processing. According to some embodiments, therefore, a health check regime/routine may be combined with reporting of pixel defects to a remote device (that is, a device that is distinct from the imaging device). Such reporting may be triggered by a request to the imaging device from the remote device, may be sent periodically by the imaging device to the remote device, may be sent as a matter of course after conclusion of each health check round/diagnosis round, may be sent by way of a wired or wireless connection, may be sent based on network availability, etc. A remote device, or a set of remote devices, such as edge nodes in an edge network, and/or such as a master controller at the factory, and/or such as another computing system such as a handheld phone or table, may aggregate pixel defect data from one or more imaging devices, and may use such data to determine the reliability the one or more imaging devices, such as based on use conditions (such as temperature, frequency of use, user, geography of use, etc.). Aggregation and processing of pixel defect data may allow a refinement of future imaging device designs, such as based on anticipated use conditions in order improve product robustness to such failure modes. Additionally, accelerated health checks may be developed based on aggregation of pixel defect data, enabling rapid feedback for investigation and continuous improvement.

For example, if a particular ultrasonic imaging device has a transducer array of 8000 pixels, the manufacturer may preset a threshold of 300 defective pixels, at or beyond which the imaging device may disable itself because it lacks sufficient pixels to produce ultrasound images of minimum quality. The imaging device may indicate to the user the number of defective pixels, possible source(s) of defect(s), and a recommendation that the imaging device be serviced or repaired prior to future operation. Alternatively, the imaging device may set itself to an inoperative state or suspend its operation due to an insufficient number of properly-operating transducer pixels, a suspended operation mode that may be reset by a qualified repair facility or manufacturer after the imaging device has been repaired sufficiently. Beyond a simple quantitative threshold of required operative transducer pixels, alternative embodiments may employ other criteria to ascertain imaging device viability, such a particular locations (e.g. X-Z coordinates in the array) of defective pixels, grouping or clusters of defective pixels, and so on.

According to an alternative embodiment, a health check routine may be triggered by a determination that the imaging device has undergone a rapid inertial change, such as by way of an accelerometer or of an inertial measurement unit (IMU). If a prescribed event such as a shock of the imaging device is measured by the accelerometer or the IMU, then the imaging device may initiate a health check routine (i.e. current pixel performance routine or quick test routine) in order to check its viability (i.e. its ability to be used to render images of the target being imaged in at least one imaging mode of the imaging device).

According to an alternative embodiment, a health check routine may be triggered by the imaging device in response to a determination that the imaging device or any portion thereof have exceeded one or more predetermined operating temperature thresholds. If one or multiple number of temperature sensors 320 monitoring the temperature of the transducer tile 210 detect that the transducer tile has exceeded one or more threshold temperatures, for example for a time period equal to or above a predetermined time threshold.

As used herein, it is to be understood that, when the imaging device is described as performing an operation, for example an operation pertaining to a pixel performance characterization/health check routine, an operation concerning communication of information or use of information pertaining to defective pixel dataset, what is meant is that any part of such operations, or all of such operations, may be performed by the control circuitry of the imaging device, such as control circuitry 106 of FIG. 1, by a computing device, such as computing device 112 of FIG. 1 or 216 of FIG. 2 (the computing device being either part of the imaging device, or coupled to the imaging device but distinct from it), and/or by any part of the processor 326 or communication circuitry 332 of the imaging device as shown in FIG. 3.

As used herein, it is to be understood that, by “defective pixel,” what is meant is a pixel whose performance has been affected by a defect, such as a defect with the pixel proper, or another defect along the propagation path of a waveform transmitted from the pixel and/or reflected back to the pixel.

Figure 16:
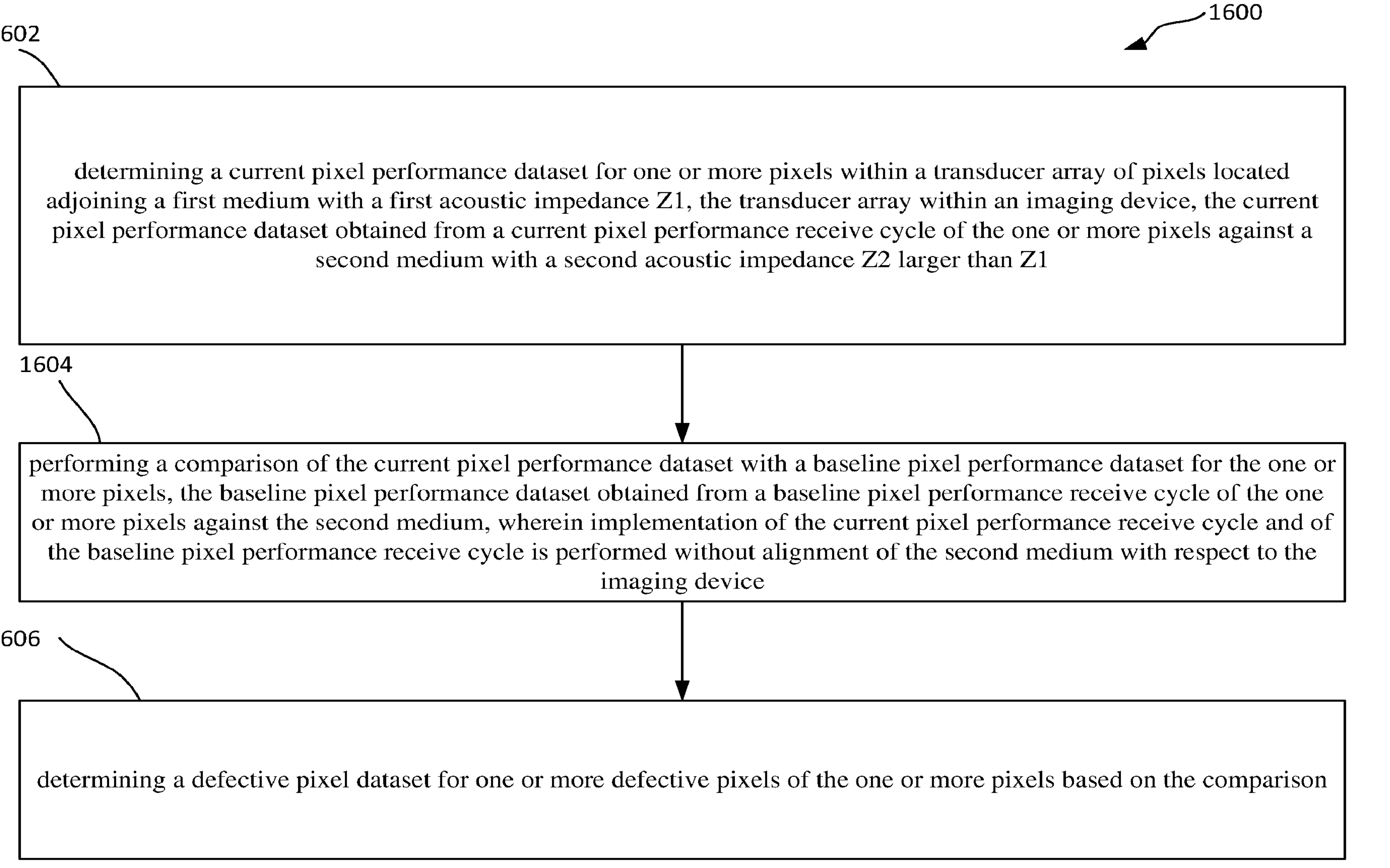
FIG. 16 is a flow diagram of a method according to yet another embodiment.

FIG. 16 is a flow chart of a process 1600 to be performed at an apparatus (such as any part of, including one or more processors of) a computing device according to some embodiments. At operation 1602, the process includes determining a current pixel performance dataset for one or more pixels within a transducer array of pixels located adjoining a first medium with a first acoustic impedance Z1, the transducer array within an imaging device, the current pixel performance dataset obtained from a current pixel performance receive cycle of the one or more pixels against a second medium with a second acoustic impedance Z2 larger than Z1. At operation 1604, the process includes performing a comparison of the current pixel performance dataset with a baseline pixel performance dataset for the one or more pixels, the baseline pixel performance dataset obtained from a baseline pixel performance receive cycle of the one or more pixels against the second medium, wherein implementation of the current pixel performance receive cycle and of the baseline pixel performance receive cycle is performed without alignment of the second medium with respect to the imaging device. At operation 1606, the process includes determining a defective pixel dataset for one or more defective pixels of the one or more pixels based on the comparison.

In an example, instructions implemented by processor 326 may be provided via the memory 336 or any other memory or storage device of the imaging device, or the processor 326 or any other processor of the imaging device, may be embodied as a tangible, non-transitory, machine-readable medium including code to direct the processor 326 to perform electronic operations in the casing. The processor 326 may access the non-transitory, machine-readable medium over the an interconnect between memory 336 and processor 326. For instance, the non-transitory, machine-readable medium may be embodied by memory 336 or a separate memory within processor 326, or may include specific storage units such as optical disks, flash drives, or any number of other hardware devices that may be plugged into the casing. The non-transitory, machine-readable medium may include instructions to direct the processor 326 to perform a specific sequence or flow of actions, for example, as described with respect to the flowchart(s) and block diagram(s) of operations and functionality depicted herein. As used herein, the terms "machine-readable medium" and "computer-readable medium" are interchangeable.

Any of the below-described Examples may be combined with any other example (or combination of examples), unless explicitly stated otherwise. Aspects described herein can also implement a hierarchical application of the scheme for example, by introducing a hierarchical prioritization of usage for different functions (e.g., low/medium/high priority, etc.).

Although implementations have been described with reference to specific exemplary aspects, it will be evident that various modifications and changes may be made to these aspects without departing from the broader scope of the present disclosure. Many of the arrangements and processes described herein can be used in combination or in parallel implementations. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed.

While preferred embodiments of the present disclosure have been shown and described herein, it will be obvious to those skilled in the art that such embodiments are provided by way of example only. It is not intended that embodiments be limited by the specific examples provided within the specification. While embodiments of the disclosure have been described with reference to the aforementioned specification, the descriptions and illustrations of the embodiments herein are not meant to be construed in a limiting sense. Numerous variations, changes, and substitutions will now occur to those skilled in the art without departing from the concepts of the present disclosure. Furthermore, it shall be understood that all aspects of the various embodiments are not limited to the specific depictions, configurations, or relative proportions set forth herein, which depend upon a variety of conditions and variables. It should be understood that various alternatives to the embodiments described herein may be employed. It is therefore contemplated that the disclosure also covers any such alternatives, modifications, variations or equivalents.

Examples

Illustrative examples of the technologies disclosed herein are provided below. An embodiment of the technologies may include any one or more, and any combination of, the examples described below.

Example 1 includes an method comprising one or more processors to: determine a current pixel performance dataset for one or more pixels within a transducer array of pixels located adjoining a first medium with a first acoustic impedance Z1, the transducer array within an imaging device, the current pixel performance dataset obtained from a current pixel performance receive cycle of the one or more pixels against a second medium with a second acoustic impedance Z2 larger than Z1; perform a comparison of the current pixel performance dataset with a baseline pixel performance dataset for the one or more pixels, the baseline pixel performance dataset obtained from a baseline pixel performance receive cycle of the one or more pixels against the second medium, wherein implementation of the current pixel performance receive cycle and of the baseline pixel performance receive cycle is performed without alignment of the second medium with respect to the imaging device; and determine a defective pixel dataset for one or more defective pixels of the one or more pixels based on the comparison.

Example 2 includes the subject matter of Example 1, wherein the one or more processors include control circuitry to perform the baseline pixel performance receive cycle and the current pixel performance receive cycle on the one or more pixels to obtain the baseline pixel performance dataset and the current pixel performance dataset respectively.

Example 3 includes the subject matter of Example 1, wherein the second medium includes a gaseous medium.

Example 4 includes the subject matter of Example 3, wherein the second medium includes air.

Example 5 includes the subject matter of Example 1, wherein the one or more processors are to cause transmit and receive channels of the transducer array to be selected for at least one of activation or deactivation based on the defective pixel dataset.

Example 6 includes the subject matter of Example 5, wherein the one or more processors include control circuitry to select the transmit and receive channels of the transducer array to be selected for at least one of activation or deactivation based on the defective pixel dataset.

Example 7 includes the subject matter of Example 1, wherein the one or more processors are further to determine, based on the defective pixel dataset, a viability for use of the imaging device based on a determination as to whether the imaging device is capable of functioning in at least one imaging mode.

Example 8 includes the subject matter of Example 7, wherein the one or more processors are to determine the viability for use based on at least one of: whether a number of the one or more pixels above a first predetermined numerical threshold are able to be used in the at least one imaging mode; or whether a number of the one or more defective pixels at a predetermined location within the transducer array are below a second predetermined numerical threshold.

Example 9 includes the subject matter of Example 1, wherein the one or more processors are to select to implement a frame reconstruction algorithm to reconstruct a frame corresponding to an image of a target being imaged by the imaging device based on the defective pixel dataset.

Example 10 includes the subject matter of any one of Examples 1-9, wherein the defective pixel dataset includes information on at least one of: a type of defect corresponding to each of or to a group of the one or more defective pixels; a location of the one or more defective pixels, wherein the location includes an address of each of the one or more defective pixels or an address range for a group of the one or more defective pixels; or an identification of the one or more defective pixels by way of respective pixel identifications (IDs).

Example 11 includes the subject matter of Example 10, wherein the defective pixel dataset includes information regarding use parameters of the imaging device during implementation of the current pixel performance receive cycle, the use parameters including at least one of: temperature of one or more portions of the transducer array or a momentum change of the transducer array.

Example 12 includes the subject matter of Example 10, wherein the current pixel performance dataset and the baseline pixel performance dataset correspond to respective waveforms, and wherein the one or more processors are to perform the comparison by comparing at least one of respective amplitudes, ringdown characteristics, phases, or ringing patterns as between a current pixel performance dataset pattern and a baseline pixel performance dataset pattern.

Example 13 includes the subject matter of Example 12, wherein the type of defect corresponds to at least one of the first medium, the second medium, or the one or more pixels, and includes at least one of delamination of the first medium or the second medium, gas bubbles in the first medium or the second medium, debris in the first medium or the second medium, underfill under at least one of the one or more pixels, or failure of at least one of the one or more pixels.

Example 14 includes the subject matter of Example 13, wherein the one or more processors are to detect a delamination of the first medium in response to a determination of a larger amplitude and longer ringing waveform for the current pixel performance dataset as compared with an amplitude and ringing waveform of baseline pixel performance dataset.

Example 15 includes the subject matter of Example 13, wherein the one or more processors are to detect gas bubbles in the first medium in response to a determination of a decreased amplitude, a changing ringdown pattern and a phase shift in the current pixel performance dataset as compared with an amplitude, ringdown pattern and phase of the baseline pixel performance dataset.

Example 16 includes the subject matter of Example 13, wherein the one or more processors are to detect a pixel failure of a pixel of the one or more pixels in response to a determination of an electrical signal for a receiver channel coupled to the pixel that exhibits a rise and decay in a time domain, but no acoustic signal from the pixel for current pixel performance dataset as compared with a behavior of the baseline pixel performance dataset.

Example 17 includes the subject matter of Example 13, wherein the one or more processors are to detect an underfill issue with respect to a pixel of the one or more pixels in response to a determination of a current pixel performance dataset that resembles a configuration of a baseline pixel performance dataset for the pixel, but with a decreased amplitude and change in ringdown characteristics as compared with an amplitude and ringdown characteristics of the baseline pixel performance dataset.

Example 18 includes the subject matter of Example 1, wherein the one or more processors are to determine a configuration of the first medium based on the defective pixel dataset.

Example 19 includes the subject matter of any one of Examples 1-9, wherein the one or more processors are to cause communication of the defective pixel dataset to a user of the imaging device via a wired or wireless communication path.

Example 20 includes the subject matter of Example 19, wherein the communication includes causing at least one of a voice indication or a visual indication of information pertaining to the defective pixel dataset to the user.

Example 21 includes the subject matter of Example 19, wherein the communication includes causing a communication of recommended next steps to the user based on the defective pixel dataset, the recommended next steps including at least one of a self-repair, a factory repair, an in-field repair, or a non-viability of the imaging device.

Example 22 includes the subject matter of any one of Examples 1-9, wherein the one or more processors are to cause communication of the defective pixel dataset to a remote device via a wired or wireless communication path to cause the remote device to aggregate the defective pixel dataset with other defective pixel dataset from other imaging devices.

Example 23 includes the subject matter of any one of Examples 1-9, wherein the one or more processors are to cause generation of the current pixel performance dataset in response to at least one of: a determination that the imaging device has undergone a rapid inertial change; or a determination that the imaging device or any portion thereof have exceeded one or more predetermined operating temperature thresholds.

Example 24 includes a method comprising: determining a current pixel performance dataset for one or more pixels within a transducer array of pixels located adjoining a first medium with a first acoustic impedance Z1, the transducer array within an imaging device, the current pixel performance dataset obtained from a current pixel performance receive cycle of the one or more pixels against a second medium with a second acoustic impedance Z2 larger than Z1; performing a comparison of the current pixel performance dataset with a baseline pixel performance dataset for the one or more pixels, the baseline pixel performance dataset obtained from a baseline pixel performance receive cycle of the one or more pixels against the second medium, wherein implementation of the current pixel performance receive cycle and of the baseline pixel performance receive cycle is performed without alignment of the second medium with respect to the imaging device; and determining a defective pixel dataset for one or more defective pixels of the one or more pixels based on the comparison.

Example 25 includes the subject matter of Example 24, further including performing the baseline pixel performance receive cycle and the current pixel performance receive cycle on the one or more pixels to obtain the baseline pixel performance dataset and the current pixel performance dataset respectively.

Example 26 includes the subject matter of Example 24, wherein the second medium includes a gaseous medium.

Example 27 includes the subject matter of Example 26, wherein the second medium includes air.

Example 28 includes the subject matter of Example 24, further including causing transmit and receive channels of the transducer array to be selected for at least one of activation or deactivation based on the defective pixel dataset.

Example 29 includes the subject matter of Example 28, further including selecting the transmit and receive channels of the transducer array to be selected for at least one of activation or deactivation based on the defective pixel dataset.

Example 30 includes the subject matter of Example 24, further including determining, based on the defective pixel dataset, a viability for use of the imaging device based on a determination as to whether the imaging device is capable of functioning in at least one imaging mode.

Example 31 includes the subject matter of Example 30, further including determining the viability for use based on at least one of: whether a number of the one or more pixels above a first predetermined numerical threshold are able to be used in the at least one imaging mode; or whether a number of the one or more defective pixels at a predetermined location within the transducer array are below a second predetermined numerical threshold.

Example 32 includes the subject matter of Example 24, further including selecting to implement a frame reconstruction algorithm to reconstruct a frame corresponding to an image of a target being imaged by the imaging device based on the defective pixel dataset.

Example 33 includes the subject matter of Example 24, wherein the defective pixel dataset includes information on at least one of: a type of defect corresponding to each of or to a group of the one or more defective pixels; a location of the one or more defective pixels, wherein the location includes an address of each of the one or more defective pixels or an address range for a group of the one or more defective pixels; or an identification of the one or more defective pixels by way of respective pixel identifications (IDs).

Example 34 includes the subject matter of Example 33, wherein the defective pixel dataset includes information regarding use parameters of the imaging device during implementation of the current pixel performance receive cycle, the use parameters including at least one of: temperature of one or more portions of the transducer array or a momentum change of the transducer array.

Example 35 includes the subject matter of Example 33, wherein the current pixel performance dataset and the baseline pixel performance dataset correspond to respective waveforms, and further including performing the comparison by comparing at least one of respective amplitudes, ringdown characteristics, phases, or ringing patterns as between a current pixel performance dataset pattern and a baseline pixel performance dataset pattern.

Example 36 includes the subject matter of Example 35, wherein the type of defect corresponds to at least one of the first medium, the second medium, or the one or more pixels, and includes at least one of delamination of the first medium or the second medium, gas bubbles in the first medium or the second medium, debris in the first medium or the second medium, underfill under at least one of the one or more pixels, or failure of at least one of the one or more pixels.

Example 37 includes the subject matter of Example 36, further including detecting a delamination of the first medium in response to a determination of a larger amplitude and longer ringing waveform for the current pixel performance dataset as compared with an amplitude and ringing waveform of baseline pixel performance dataset.

Example 38 includes the subject matter of Example 36, further including detecting gas bubbles in the first medium in response to a determination of a decreased amplitude, a changing ringdown pattern and a phase shift in the current pixel performance dataset as compared with an amplitude, ringdown pattern and phase of the baseline pixel performance dataset.

Example 39 includes the subject matter of Example 36, further including detecting a pixel failure of a pixel of the one or more pixels in response to a determination of an electrical signal for a receiver channel coupled to the pixel that exhibits a rise and decay in a time domain, but no acoustic signal from the pixel for current pixel performance dataset as compared with a behavior of the baseline pixel performance dataset.

Example 40 includes the subject matter of Example 36, further including detecting an underfill issue with respect to a pixel of the one or more pixels in response to a determination of a current pixel performance dataset that resembles a configuration of a baseline pixel performance dataset for the pixel, but with a decreased amplitude and change in ringdown characteristics as compared with an amplitude and ringdown characteristics of the baseline pixel performance dataset.

Example 41 includes the subject matter of Example 24, further including determining a configuration of the first medium based on the defective pixel dataset.

Example 42 includes the subject matter of Example 24, further including causing communication of the defective pixel dataset to a user of the imaging device via a wired or wireless communication path.

Example 43 includes the subject matter of Example 42, wherein the communication includes causing at least one of a voice indication or a visual indication of information pertaining to the defective pixel dataset to the user.

Example 44 includes the subject matter of Example 42, wherein the communication includes causing a communication of recommended next steps to the user based on the defective pixel dataset, the recommended next steps including at least one of a self-repair, a factory repair, an in-field repair, or a non-viability of the imaging device.

Example 45 includes the subject matter of Example 24, further including causing communication of the defective pixel dataset to a remote device via a wired or wireless communication path to cause the remote device to aggregate the defective pixel dataset with other defective pixel dataset from other imaging devices.

Example 46 includes the subject matter of Example 24, further including causing generation of the current pixel performance dataset in response to at least one of: a determination that the imaging device has undergone a rapid inertial change; or a determination that the imaging device or any portion thereof have exceeded one or more predetermined operating temperature thresholds.

Example 47 includes an apparatus comprising means for performing the method of any one of Examples 24-46.

Example 48 includes one or more computer-readable media comprising a plurality of instructions stored thereon that, when executed, cause one or more processors to perform the method of any one of Examples 24-46.

Example 49 includes an imaging device comprising the apparatus of any one of Examples 1-45, the imaging device including the transducer array.

Example 50 includes the subject matter of Example 49, further including a housing, the apparatus being disposed in the housing.

Example 51 includes the subject matter of Example 50, further including a display.

Example 52 includes a product comprising one or more tangible computer-readable non-transitory storage media comprising computer-executable instructions operable to, when executed by at least one computer processor, enable the at least one processor to perform the method of any one of Examples 24-46.

What is claimed is:

1. An apparatus comprising one or more processors to:

determine a current pixel performance dataset for one or more pixels within a transducer array of pixels located adjoining a first medium with a first acoustic impedance Z1, the transducer array within an imaging device, the current pixel performance dataset comprising waveforms obtained from a current pixel performance receive cycle of the one or more pixels against a second medium with a second acoustic impedance Z2 larger than Z1;

perform a comparison of the current pixel performance dataset with a baseline pixel performance dataset for the one or more pixels, the baseline pixel performance dataset comprising waveforms obtained from a baseline pixel performance receive cycle of the one or more pixels against the second medium, wherein implementation of the current pixel performance receive cycle and of the baseline pixel performance receive cycle is performed without alignment of the second medium with respect to the imaging device, wherein performing the comparison comprises comparing at least one of respective amplitudes, ringdown characteristics, phases, or ringing patterns as between waveforms of the current pixel performance dataset and waveforms of the baseline pixel performance dataset pattern; and determine a defective pixel dataset for one or more defective pixels of the one or more pixels based on the comparison; cause a pixel heatmap visualization based on the defective pixel dataset to be displayed to a user of the imaging device.

2. The apparatus of claim 1, wherein the one or more processors include control circuitry to perform the baseline pixel performance receive cycle and the current pixel performance receive cycle on the one or more pixels to obtain the baseline pixel performance dataset and the current pixel performance dataset respectively.

3. The apparatus of claim 1, wherein the one or more processors are to cause transmit and receive channels of the transducer array to be selected for at least one of activation or deactivation based on the defective pixel dataset.

4. The apparatus of claim 3, wherein the one or more processors include control circuitry to select the transmit and receive channels of the transducer array to be selected for at least one of activation or deactivation based on the defective pixel dataset.

5. The apparatus of claim 1, wherein the one or more processors are further to determine, based on the defective pixel dataset, a viability for use of the imaging device based on a determination as to whether the imaging device is capable of functioning in at least one imaging mode, wherein the one or more processors are to determine the viability for use based on at least one of:

whether a number of the one or more pixels above a first predetermined numerical threshold are able to be used in the at least one imaging mode; or whether a number of the one or more defective pixels at a predetermined location within the transducer array are below a second predetermined numerical threshold.

6. The apparatus of claim 1, wherein the one or more processors are to select to implement a frame reconstruction algorithm to reconstruct a frame corresponding to an image of a target being imaged by the imaging device based on the defective pixel dataset.

7. The apparatus of claim 1, wherein the defective pixel dataset includes information on at least one of:

a type of defect corresponding to each of or to a group of the one or more defective pixels;

a location of the one or more defective pixels, wherein the location includes an address of each of the one or more defective pixels or an address range for a group of the one or more defective pixels; or an identification of the one or more defective pixels by way of respective pixel identifications (IDs).

8. The apparatus of claim 7, wherein the defective pixel dataset includes information regarding use parameters of the imaging device during implementation of the current pixel performance receive cycle, the use parameters including at least one of: temperature of one or more portions of the transducer array or a momentum change of the transducer array.

9. The apparatus of claim 7, wherein the type of defect corresponds to at least one of the first medium, the second medium, or the one or more pixels, and includes at least one of delamination of the first medium or the second medium, gas bubbles in the first medium or the second medium, debris in the first medium or the second medium, underfill under at least one of the one or more pixels, or failure of at least one of the one or more pixels.

10. The apparatus of claim 9, wherein the one or more processors are to detect a delamination of the first medium in response to a determination of a larger amplitude and longer ringing waveform for the current pixel performance dataset as compared with an amplitude and ringing waveform of baseline pixel performance dataset.

11. The apparatus of claim 9, wherein the one or more processors are to detect gas bubbles in the first medium in response to a determination of a decreased amplitude, a changing ringdown pattern and a phase shift in the current pixel performance dataset as compared with an amplitude, ringdown pattern and phase of the baseline pixel performance dataset.

12. The apparatus of claim 9, wherein the one or more processors are to detect a pixel failure of a pixel of the one or more pixels in response to a determination of an electrical signal for a receiver channel coupled to the pixel that exhibits a rise and decay in a time domain, but no acoustic signal from the pixel for current pixel performance dataset as compared with a behavior of the baseline pixel performance dataset.

13. The apparatus of claim 9, wherein the one or more processors are to detect an underfill issue with respect to a pixel of the one or more pixels in response to a determination of a current pixel performance dataset that resembles a configuration of a baseline pixel performance dataset for the pixel, but with a decreased amplitude and change in ringdown characteristics as compared with an amplitude and ringdown characteristics of the baseline pixel performance dataset.

14. The apparatus of claim 1, wherein the one or more processors are to cause generation of the current pixel performance dataset in response to at least one of:

a determination that the imaging device has undergone a rapid inertial change; or a determination that the imaging device or any portion thereof have exceeded one or more predetermined operating temperature thresholds.

15. A method comprising:

determining a current pixel performance dataset for one or more pixels within a transducer array of pixels located adjoining a first medium with a first acoustic impedance Z1, the transducer array within an imaging device, the current pixel performance dataset comprising waveforms obtained from a current pixel performance receive cycle of the one or more pixels against a second medium with a second acoustic impedance Z2 larger than Z1;

performing a comparison of the current pixel performance dataset with a baseline pixel performance dataset for the one or more pixels, the baseline pixel performance dataset comprising waveforms obtained from a baseline pixel performance receive cycle of the one or more pixels against the second medium, wherein implementation of the current pixel performance receive cycle and of the baseline pixel performance receive cycle is performed without alignment of the second medium with respect to the imaging device, wherein performing the comparison comprises comparing at least one of respective amplitudes, ringdown characteristics, phases, or ringing patterns as between waveforms of the current pixel performance dataset and waveforms of the baseline pixel performance dataset pattern; and determining a defective pixel dataset for one or more defective pixels of the one or more pixels based on the comparison;

displaying a pixel heatmap visualization to a user of the imaging device, the pixel heatmap visualization based on the defective pixel dataset.

16. The method of claim 15, further including performing the baseline pixel performance receive cycle and the current pixel performance receive cycle on the one or more pixels to obtain the baseline pixel performance dataset and the current pixel performance dataset respectively.

17. The method of claim 15, further including causing transmit and receive channels of the transducer array to be selected for at least one of activation or deactivation based on the defective pixel dataset.

18. The method of claim 15, further including selecting to implement a frame reconstruction algorithm to reconstruct a frame corresponding to an image of a target being imaged by the imaging device based on the defective pixel dataset.

19. The method of claim 15, wherein the defective pixel dataset includes information on at least one of:

a type of defect corresponding to each of or to a group of the one or more defective pixels;

a location of the one or more defective pixels, wherein the location includes an address of each of the one or more defective pixels or an address range for a group of the one or more defective pixels; or an identification of the one or more defective pixels by way of respective pixel identifications (IDs).

20. One or more non-transitory computer-readable media comprising a plurality of instructions stored thereon that, when executed, cause one or more processors to:

determine a current pixel performance dataset for one or more pixels within a transducer array of pixels located adjoining a first medium with a first acoustic impedance Z1, the transducer array within an imaging device, the current pixel performance dataset comprising waveforms obtained from a current pixel performance receive cycle of the one or more pixels against a second medium with a second acoustic impedance Z2 larger than Z1;

perform a comparison of the current pixel performance dataset with a baseline pixel performance dataset for the one or more pixels, the baseline pixel performance dataset comprising waveforms obtained from a baseline pixel performance receive cycle of the one or more pixels against the second medium, wherein implementation of the current pixel performance receive cycle and of the baseline pixel performance receive cycle is performed without alignment of the second medium with respect to the imaging device, wherein performing the comparison comprises comparing at least one of respective amplitudes, ringdown characteristics, phases, or ringing patterns as between waveforms of the current pixel performance dataset and waveforms of the baseline pixel performance dataset pattern; and determine a defective pixel dataset for one or more defective pixels of the one or more pixels based on the comparison; and cause a pixel heatmap visualization to be displayed, the pixel heatmap visualization based on the defective pixel dataset.

21. The computer-readable media of claim 20, wherein the instructions further cause one or more processors to perform the baseline pixel performance receive cycle and the current pixel performance receive cycle on the one or more pixels to obtain the baseline pixel performance dataset and the current pixel performance dataset respectively.

22. The computer-readable media of claim 20, wherein the instructions further cause one or more processors to cause transmit and receive channels of the transducer array to be selected for at least one of activation or deactivation based on the defective pixel dataset.

23. The computer-readable media of claim 20, wherein the instructions further cause one or more processors to determine, based on the defective pixel dataset, a viability for use of the imaging device based on a determination as to whether the imaging device is capable of functioning in at least one imaging mode.

24. The computer-readable media of claim 20, wherein the defective pixel dataset includes information on at least one of:

a type of defect corresponding to each of or to a group of the one or more defective pixels;

a location of the one or more defective pixels, wherein the location includes an address of each of the one or more defective pixels or an address range for a group of the one or more defective pixels; or an identification of the one or more defective pixels by way of respective pixel identifications (IDs).

* * * * *